United States Patent
Xu et al.

(10) Patent No.: US 12,096,433 B2
(45) Date of Patent: Sep. 17, 2024

(54) SIGNAL TRANSMISSION METHOD AND APPARATUS, MOBILE TERMINAL AND STORAGE MEDIUM

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 380 days.

(21) Appl. No.: 17/546,007

(22) Filed: Dec. 8, 2021

(65) Prior Publication Data

US 2022/0116930 A1 Apr. 14, 2022

Related U.S. Application Data

(63) Continuation of application No. PCT/CN2020/086438, filed on Apr. 23, 2020.

(30) Foreign Application Priority Data

Oct. 1, 2019 (WO) ................ PCT/CN2019/109782

(51) Int. Cl.
*H04W 72/20* (2023.01)
*H04W 72/044* (2023.01)

(52) U.S. Cl.
CPC ......... *H04W 72/20* (2023.01); *H04W 72/044* (2013.01)

(58) Field of Classification Search
CPC .............................. H04W 72/70; H04Q 72/044
(Continued)

(56) References Cited

U.S. PATENT DOCUMENTS 11,770,870 B2* 9/2023 Venugopal ............. H04B 7/088
370/330
11,792,787 B2* 10/2023 Wu ....................... H04B 7/0617
370/330

(Continued)

FOREIGN PATENT DOCUMENTS

| CN | 106922032 | 7/2017 |
| CN | 107733616 | 2/2018 |

(Continued)

OTHER PUBLICATIONS

"International Search Report (Form PCT/ISA/210) of PCT/CN2020/086438", mailed on Jul. 9, 2020, with English translation thereof, pp. 1-6.

(Continued)

*Primary Examiner* — Anthony Mejia
(74) *Attorney, Agent, or Firm* — JCIP GLOBAL INC.

(57) ABSTRACT

The present invention relates to the technical field of communications. Disclosed are a signal transmission method and apparatus, a mobile terminal, and a storage medium. The present solution comprises: when a conflict over transmission resources occurs, determining, according to transmission configuration information and resource indication information, a start position and/or an end position for signal processing in a first time-frequency resource; and performing signal processing on a first service signal according to the start position and/or the end position in the first time-frequency resource, so as to avoid mutual interference between the first service signal and a second service signal. The invention effectively solves the problem of uplink transmission conflicts between URLLC and eMBB while ensuring accurate signal transmission, and improves the efficiency of resource utilization.

16 Claims, 14 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2014/0161095 | A1* | 6/2014 | Nan | H04W 56/002 |
| | | | | 370/328 |
| 2018/0035322 | A1 | 2/2018 | Yamine et al. | |
| 2018/0035332 | A1* | 2/2018 | Agiwal | H04W 28/16 |
| 2018/0279331 | A1 | 9/2018 | Shaheen et al. | |
| 2019/0268938 | A1 | 8/2019 | Zhao et al. | |
| 2021/0360651 | A1* | 11/2021 | Li | H04W 72/1268 |

FOREIGN PATENT DOCUMENTS

| | | |
|---|---|---|
| CN | 108282879 | 7/2018 |
| CN | 109274470 | 1/2019 |
| CN | 109314988 | 2/2019 |
| CN | 109391388 | 2/2019 |
| CN | 109392101 | 2/2019 |
| CN | 109413622 | 3/2019 |
| CN | 109587807 | 4/2019 |
| CN | 109618362 | 4/2019 |
| CN | 110099445 | 8/2019 |
| WO | 2019032844 | 2/2019 |

OTHER PUBLICATIONS

"Written Opinion of the International Searching Authority (Form PCT/ISA/237) of PCT/CN2020/086438", mailed on Jul. 9, 2020, with English translation thereof, pp. 1-6.

"International Search Report (Form PCT/ISA/210) of PCT/CN2019/109782", mailed on Jun. 29, 2020, with English translation thereof, pp. 1-6.

"Written Opinion of the International Searching Authority (Form PCT/ISA/237) of PCT/CN2019/109782", mailed on Jun. 29, 2020, with English translation thereof, pp. 1-5.

Intel Corporation, "eMBB/URLLC multiplexing for UL," 3GPP TSG RAN1 WG Meeting #88bis, Apr. 2017, pp. 1-6.

"Search report of counterpart Europe application No. 20872365.0, issued on Jun. 21, 2022, p. 1-p. 8."

Intel Corporation, "PUCCH and PUSCH collision handling," 3GPP TSG RAN WG1 Meeting #92 R1-1802411, Feb. 2018, pp. 1-3.

Panasonic, "Discussion on partial overlap between PUCCH and PUSCH," 3GPP TSG RAN WG1 Meeting #92 R1-1802512, Feb. 2018, pp. 1-3.

Huawei, Hisilicon, "Discussion on partially overlapped PUCCH and PUSCH," 3GPP TSG RAN WG1 Meeting #92 R1-1801788, Feb. 2018, pp. 1-5.

Huawei, Hisilicon, "Discussion on UCI feedback for URLLC," 3GPP TSG RAN WG1 Ad Hoc Meeting R1-1800054, Jan. 2018, pp. 1-13.

Huawei, Hisilicon, "Outcome of the offline discussion for PUCCH structure in long-duration," 3GPP TSG RAN WG1 Meeting #92bis R1-1805733, Apr. 2018, pp. 1-17.

MCC Support, "Final Report of 3GPP TSG RAN WG1 #100-e v2.0.0", 3GPP TSG RAN WG1 Meeting #100bis-e, Apr. 20-30, 2020, pp. 1-111.

"Office Action of Europe Counterpart Application, Application No. 20872365.0", issued on Aug. 2, 2023, pp. 1-5.

Office Action of China Counterpart Application, Application No. 202210514988.8, with English translation thereof, issued on Jun. 10, 2023, pp. 1-22.

"Office Action of Europe Counterpart Application, Application No. 20872365.0", issued on Feb. 27, 2023, p. 1-p. 10.

Catt, "On multiplexing of different UCI transmissions", 3GPP TSG RAN WG1 Meeting #92bis R1-1803754, Apr. 2018, pp. 1-8.

* cited by examiner

SIGNAL TRANSMISSION METHOD AND APPARATUS, MOBILE TERMINAL AND STORAGE MEDIUM

CROSS-REFERENCE TO RELATED APPLICATION

This application is a continuation of international PCT application serial no. PCT/CN2020/086438, filed on Apr. 23, 2020, which claims the priority benefit of PCT application serial no. PCT/CN2019/109782 filed on Oct. 1, 2019. The entirety of each of the above mentioned patent applications is hereby incorporated by reference herein and made a part of this specification.

FIELD OF THE DISCLOSURE

The invention relates to the field of communication technology, and in particular to a signal transmission method and apparatus, a mobile terminal and a storage medium.

DESCRIPTION OF RELATED ART

The existing 5G system introduces two services: ultra-reliable low latency communication (URLLC) and enhanced mobile broadband (eMBB).

When both URLLC and eMBB coexist, in order to realize the instantaneous transmission of URLLC, URLLC and eMBB will conflict each other. That is, URLLC occupies resources that have been allocated to eMBB. When URLLC and eMBB transmission conflict each other, URLLC and eMBB will interfere with each other, thus affecting the demodulation performance of URLLC and eMBB. Information retransmission can solve this issue, but it will cause an increase in the transmission delay of URLLC. Currently there is no effective solution to the problem of upstream transmission conflict between URLLC and eMBB.

SUMMARY OF THE DISCLOSURE

The main purpose of the invention is to provide a signal transmission method and apparatus, a mobile terminal and a storage medium.

In order to achieve the above purpose, the invention provides a signal transmission method. The signal transmission method includes the following steps:

Transmission configuration information of a first service signal is acquired, and a first time-frequency resource allocated for the first service signal is determined according to the transmission configuration information.

Resource indication information is received.

A start position and/or end position for signal processing in the first time-frequency resource is determined according to the transmission configuration information and the resource indication information.

In addition, an embodiment of the invention further provides a signal transmission apparatus, and the signal transmission apparatus includes:

A configuration acquisition unit is configured to acquire transmission configuration information of the first service signal, and determine the first time-frequency resource allocated for the first service signal according to the transmission configuration information.

A resource determining unit is configured to receive resource indication information.

A position determining unit is configured to determine a start position and/or an end position for signal processing in the first time-frequency resource according to the transmission configuration information and resource indication information.

In addition, an embodiment of the invention further provides a mobile terminal. The mobile terminal includes a memory, a processor, and a signal transmission program that is stored on the memory and can be run on the processor. The signal transmission program implements the steps of the signal transmission method as described above when being executed by the processor.

Moreover, an embodiment of the invention further provides a computer-readable storage medium having a signal transmission program stored on the computer-readable storage medium, and when the signal transmission program is executed by a processor, the steps of the signal transmission method described above are implemented.

Figure 1:
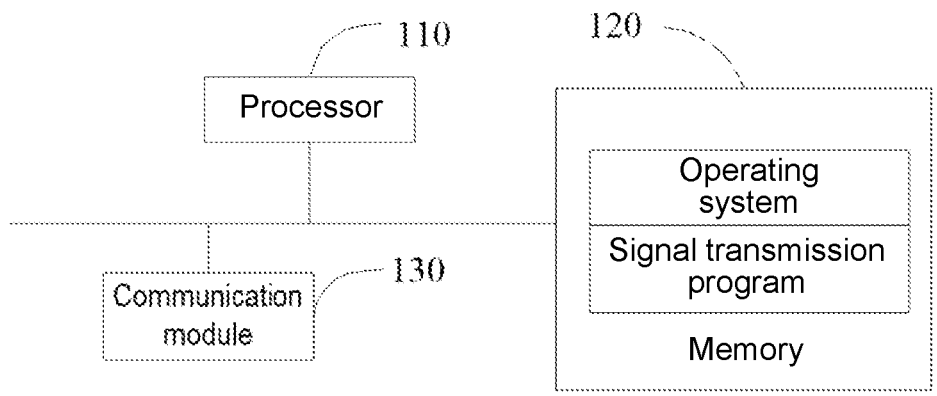
FIG. 1 is a schematic diagram of a functional module of a signal transmission system of the invention.

The realization of the purpose, functional characteristics and advantages of the invention will be further described in conjunction with the embodiments and with reference to the accompanying drawings.

DESCRIPTION OF EMBODIMENTS

It should be understood that the specific embodiments described here are only used to explain the invention, but not to limit the invention.

The main solution of the embodiment of the invention is: acquiring the transmission configuration information of the first service signal, and determining the first time-frequency resource allocated for the first service signal according to the transmission configuration information; receiving the resource indication information; determining the start position and/or the end position for signal processing in the first time-frequency resource according to the transmission configuration information and resource indication information. In the solution, when there is a conflict in transmission resource, the start position and/or end position for signal processing in the first time-frequency resource are determined according to the transmission configuration information and the resource indication information. Signal processing may be performed on the first service signal according to the start position and/or end position in the first time-frequency resource, thereby avoiding interference caused by other service signals on the first service signal, and effectively solving the problem of uplink transmission conflicts between URLLC and eMBB while ensuring accurate signal transmission. In this manner, efficiency of resource use can be improved. This solution is based on a pure software solution on the existing mobile terminal and will not cause any increase in cost. In the meantime, since the start position and/or end position for the signal processing are determined by the mobile terminal, it will not increase the logic processing complexity of the base station.

The main technical terms involved in the embodiments of this invention include: URLLC (Ultra-reliable low latency communication): Abbreviation for ultra-reliable low latency communication, which is characterized by high reliability, low latency, and extremely high availability. URLLC involves the following various scenarios and applications: industrial applications and control, traffic safety and control, remote manufacturing, remote training, remote surgery, etc. eMBB (Enhanced Mobile Broadband): Abbreviation for enhanced mobile broadband. eMBB refers to the further improvement of user experience and other performance based on the existing mobile broadband business scenarios. The main purpose is to pursue the ultimate experience of communication between people. As the name implies, eMMB is a technology dedicated to serving mobile devices such as mobile phones.
PUSCH (Physical Uplink Shared Channel): Abbreviation for physical uplink shared channel. In addition to transmitting control information, PUSCH also transmits uplink data. PUSCH is typically in the middle of the frequency band and occupies most of the resources.
PUCCH (Physical Uplink Control Channel): Abbreviation for physical uplink control channel. PUCCH is mainly used to transmit control information. PUCCH is normally located at both ends of the frequency band and occupies a small amount of resources.
Sidelink: It belongs to another important branch in the cellular Internet of Things technology, called device to device communication. Although sidelink is literally translated in Chinese, this emerging communication technology is not "marginal" at all, and even create a broad application prospect for IoT applications, disrupting the conventional cellular network communication architecture and even operations.
NR (new radio): Abbreviation of new radio. 5GNR is the abbreviation of 5G new radio, which is a major focus for research and development in today's communications industry.
CRC (Cyclic Redundancy Check): Abbreviation of cyclic redundancy check. CRC is a channel coding technology that generates a short fixed bit number check code based on data such as network data packets or computer files. CRC is mainly used for detecting or calibrating the errors that may occur after the data is transferred or saved.
UCI (Uplink Control Information): Abbreviation for uplink control signal. The content of UCI is that the mobile terminal feeds back some control information to the base station, such as measurement report, scheduling request or confirmation message.

Specifically, referring to FIG. 1, FIG. 1 is a schematic diagram of a functional module of the signal transmission system of the invention. The signal transmission system can be a component that is independent of the mobile terminal and can perform data processing, and it can be carried on the mobile terminal in the form of hardware or software.

In this embodiment, the signal transmission system at least includes a processor 110, a memory 120, and a communication module 130.

An operating system and a signal transmission program are stored in the memory 120, and the signal transmission system can perform signal transmission with a base station or other equipment through the communication module 130.

The communication module 130 may include a mobile communication module, certainly, may also include a WIFI module, etc., which is not limited in this embodiment.

When the signal transmission program in the first memory 130 is executed by the processor, the following steps are implemented: acquiring the transmission configuration information of the first service signal, and determining the first time-frequency resource allocated for the first service signal according to the transmission configuration information; receiving the resource indication information; determining the start position and/or the end position for signal processing in the first time-frequency resource according to the transmission configuration information and resource indication information.

Through the above solution provided in the embodiment, transmission configuration information of a first service signal is acquired, and a first time-frequency resource allocated for the first service signal is determined according to the transmission configuration information. Resource indication information is received. A start position and/or end position for signal processing in the first time-frequency resource is determined according to the transmission configuration information and the resource indication information. In the solution, when there is a conflict in transmission resource, the start position and/or end position for signal processing in the first time-frequency resource are determined according to the transmission configuration information and the resource indication information. Signal processing may be performed on the first service signal according to the start position and/or end position in the first time-frequency resource, thereby avoiding interference caused by other service signals on the first service signal, and effectively solving the problem of uplink transmission conflicts between URLLC and eMBB while ensuring accurate signal transmission. In this manner, efficiency of resource use can be improved. This solution is based on a pure software solution on the existing mobile terminal and will not cause any increase in cost. In the meantime, since the start position and/or end position for the signal processing are determined by the mobile terminal, it will not increase the logic processing complexity of the base station.

Based on the foregoing architecture of device, an embodiment for the method of the invention is provided.

Figure 2:
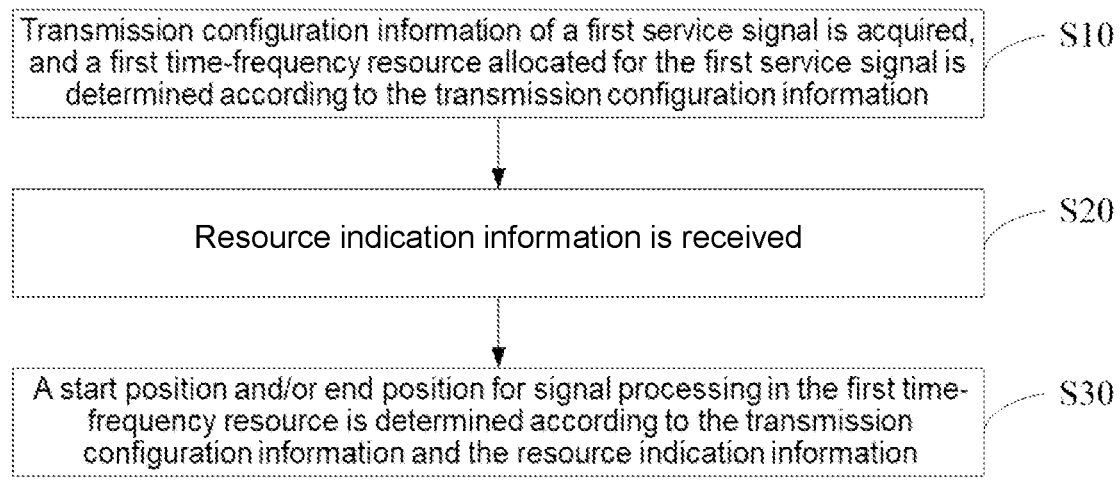
FIG. 2 is a schematic flowchart of an exemplary embodiment of a signal transmission method according to the invention.

Referring to FIG. 2, FIG. 2 is a schematic flowchart of an exemplary embodiment of a signal transmission method of the invention. In this embodiment, the signal transmission method includes the following steps:

S10: Transmission configuration information of the first service signal is acquired, and the first time-frequency resource allocated for the first service signal is determined according to the transmission configuration information.

Figure 3:
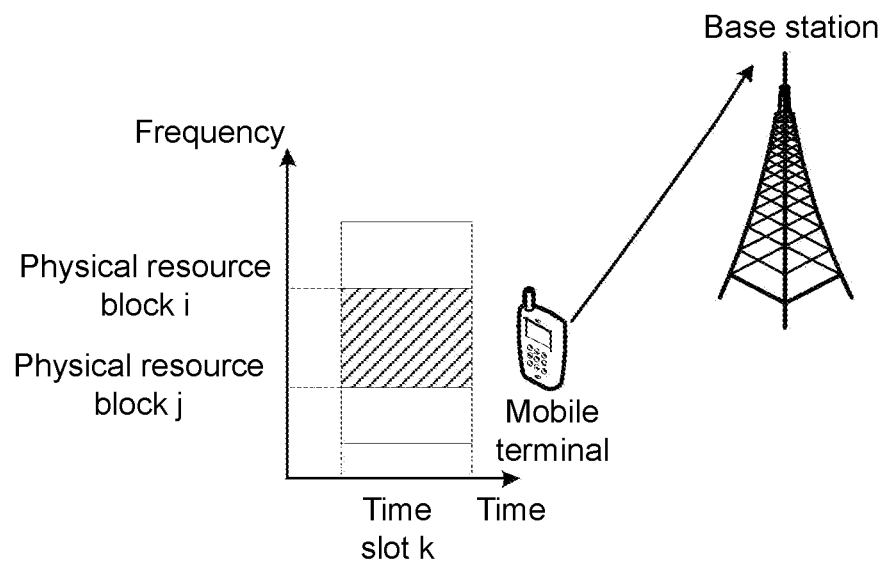
FIG. 3 is a schematic diagram of time-frequency resources in an embodiment of the invention.

It should be noted that time-frequency resources can be interpreted as the frequency band required to transmit service signals in a certain time slot. That is to say, time-frequency resources have two-dimensional characteristics in two dimensions, namely time domain and frequency domain. Please refer to FIG. 3, when the mobile terminal needs to perform service transmission, the time-frequency resource allocated by the base station is time slot k in the time domain, and the frequency band in the frequency domain is physical resource block j to physical resource block i. In other words, for the mobile terminal, the time-frequency resource allocated by the base station is the part filled with diagonal lines in FIG. 3.

It is understandable that the first service signal can be interpreted as the service signal that needs to be transmitted at this time, and it is normally required to send a service request to the base station. Under the circumstances, the base station will allocate corresponding transmission configuration information for the mobile terminal. The transmission configuration information has parameters that can be embodied as the time-frequency resources allocated for it. Therefore, in this embodiment, the first time-frequency resource allocated for the first service signal can be determined according to the transmission configuration information. To facilitate to determine the first time-frequency resource, in a specific implementation, the transmission configuration information includes at least one of a channel type, a transmission mode, a channel format, a resource configuration mode, and a priority.

The priority may be the priority indicated by the priority index field in the scheduling or configuration information when scheduling or configuring the first time-frequency resource. The priority index field may be 1 bit, which is specifically used to indicate two different priorities, that is, the first priority and the second priority. For example, 0 is used to indicate the first priority, 1 is used to indicate the second priority, or 1 is used to indicate the first priority, and 0 is used to indicate the second priority. The priority may specifically be used to indicate the priority of the services to which the first service signal belongs, and may also be used to indicate the priority of the scheduled or configured time-frequency resources, which is not specifically limited herein.

It should be understood that for some specific scenarios, such as the scenario of sidelink, since the scenario belongs to the communication between the mobile terminal and the mobile terminal, there is no base station in this communication scenario. Therefore, the transmission configuration information can be generated locally and automatically by the mobile terminal. Certainly, the transmission configuration information can also be allocated in other ways, such as being allocated by the mobile terminal at the opposite end of the communication, which is not limited in this embodiment.

S20: Resource indication information is received.

It should be noted that, in terms of resource indication information, in a communication scenario with a base station, the resource indication information can be sent by the base station. That is, in terms of the base station, when the base station receives a service request sent for another mobile terminal, the second time-frequency resource is allocated for the second service signal, but there is possibility that the second time-frequency resource and the first time-frequency resource have resource conflict. Therefore, the base station will generate resource indication information according to the second time-frequency resource, and the resource indication information is sent to the mobile terminal that applies for transmission of the first service signal.

It should be understood that in some specific scenarios, such as a scenario of sidelink, which belongs to the communication between the mobile terminal and the mobile terminal, under the circumstances, the resource indication information may be generated for the mobile terminal at the opposite end.

It is understandable that eMBB and URLLC are two services introduced in the current 5GNR system, but for URLLC, it is normally used in scenarios that require timely transmission, such as automatic driving, etc. If the signal is not transmitted in time, serious impact will occur. Since EMBB is normally applied in communication scenarios between mobile terminals, in this embodiment, the first service information may be eMBB service signals or URLLC service signals.

When the first service information is an eMBB service signal, in order to avoid its interference on the URLLC service signal, for the mobile terminal, the available method is signal cancel, that is, the signal processing is signal cancel.

When the first service information is a URLLC service signal, in order to avoid the interference of the eMBB service signal on the URLLC service signal, for the mobile terminal, the method that can be adopted is signal power adjustment, that is, the signal processing is signal power adjustment, for example: increase signal power.

It should be noted that by increasing the signal power of the URLLC service signal, the signal-to-noise ratio of the URLLC service signal can be increased, thereby increasing the decoding success rate of the URLLC service signal.

Certainly, the first service signal can also be set as another type of service signal, which is not limited in this embodiment.

S30: A start position and/or end position for signal processing in the first time-frequency resource is determined according to the transmission configuration information and the resource indication information.

In a specific implementation, since the first time-frequency resource allocated for the first service signal can be determined according to the transmission configuration information, the first time-frequency resource can be reflected in the transmission configuration information. Accordingly, the start position and/or the end position for the signal processing in the first time-frequency resource can be determined according to the transmission configuration information and the second time-frequency resource.

It should be understood that, in terms of the first time-frequency resource and the second time-frequency resource, there may or may not be a conflict. Generally speaking, if there is a conflict, it is necessary to perform signal processing on the first time-frequency resource. If there is no conflict, there is no need to perform signal processing on the first time-frequency resource, thereby avoiding the normal processing of the first service signal. Therefore, before step S30, first it can be determined whether it is necessary to perform signal processing on the first time-frequency resource based on the transmission configuration information and the second time-frequency resource. When it is necessary to perform signal processing on the first time-frequency resource, step S30 is performed. When it is not necessary to perform signal processing on the first time-frequency resource, the first service signal may be transmitted through the first time-frequency resource according to the normal procedure.

It should be noted that due to the two-dimensional characteristics of time-frequency resources, there is a resource conflict between two time-frequency resources, which can be interpreted as that there is at least a partial overlap between the two time-frequency resources.

Figure 4:
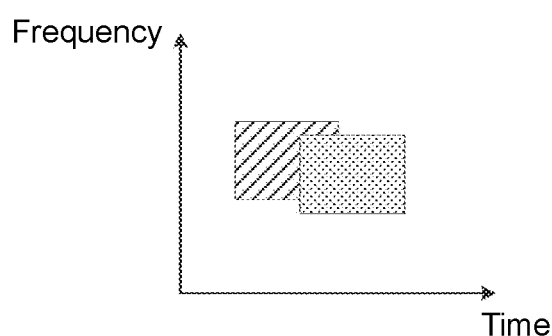
FIG. 4 is a schematic diagram of a conflict between two time-frequency resources in an embodiment of the invention.

Referring to FIG. 4, it is assumed that the first time-frequency resource corresponds to the part filled with diagonal lines, and the second time-frequency resource corresponds to the part filled with dots. Under the circumstances, since there is a partial overlap between the first time-frequency resource and the second time-frequency resource, it can be regarded that there is a conflict between the first time-frequency resource and the second time-frequency resource, and it is necessary to perform signal processing on the first time-frequency resource.

Figure 5:
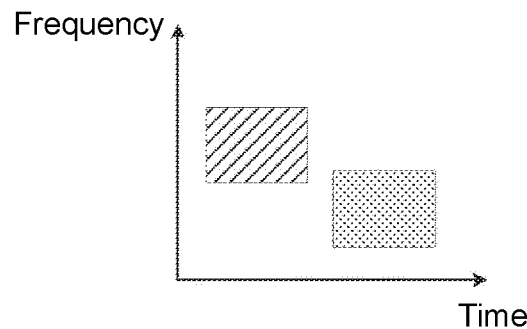
FIG. 5 is a schematic diagram showing that there is no conflict between two time-frequency resources in an embodiment of the invention.

Referring to FIG. 5, it is also assumed that the first time-frequency resource corresponds to the part filled with diagonal lines, and the second time-frequency resource corresponds to the part filled with dots. Under the circumstances, since there is no overlap between the first time-frequency resource and the second time-frequency resource, it can be regarded that there is no conflict between the first time-frequency resource and the second time-frequency resource, and there is no need to perform signal processing on the first time-frequency resource.

Therefore, in the case where there is at least a partial overlap between two time-frequency resources, the overlapped part can be interpreted as a conflict resource where the two time-frequency resources conflict each other.

In a specific implementation, when there is a resource conflict between the first service signal and the second service signal, in order to ensure that the transmission of the second service signal is not interfered, in this embodiment, after the step S30, the method further includes: performing signal processing on the first service signal according to the start position and/or end position in the first time-frequency resource. The signal processing includes: signal cancel or signal power adjustment, which can effectively avoid mutual interference between the first service signal and the second service signal.

Through the above solution provided in the embodiment, transmission configuration information of a first service signal is acquired, and a first time-frequency resource allocated for the first service signal is determined according to the transmission configuration information. Resource indication information is received. A start position and/or end position for signal processing in the first time-frequency resource is determined according to the transmission configuration information and the resource indication information. In the solution, when there is a conflict in transmission resource, the start position and/or end position for signal processing in the first time-frequency resource are determined according to the transmission configuration information and the resource indication information. Signal processing may be performed on the first service signal according to the start position and/or end position in the first time-frequency resource, thereby avoiding interference caused by other service signals on the first service signal, and effectively solving the problem of uplink transmission conflicts between URLLC and eMBB while ensuring accurate signal transmission. In this manner, efficiency of resource use can be improved. This solution is based on a pure software solution on the existing mobile terminal and will not cause any increase in cost. In the meantime, since the start position and/or end position for the signal processing are determined by the mobile terminal, it will not increase the logic processing complexity of the base station.

Figure 6:
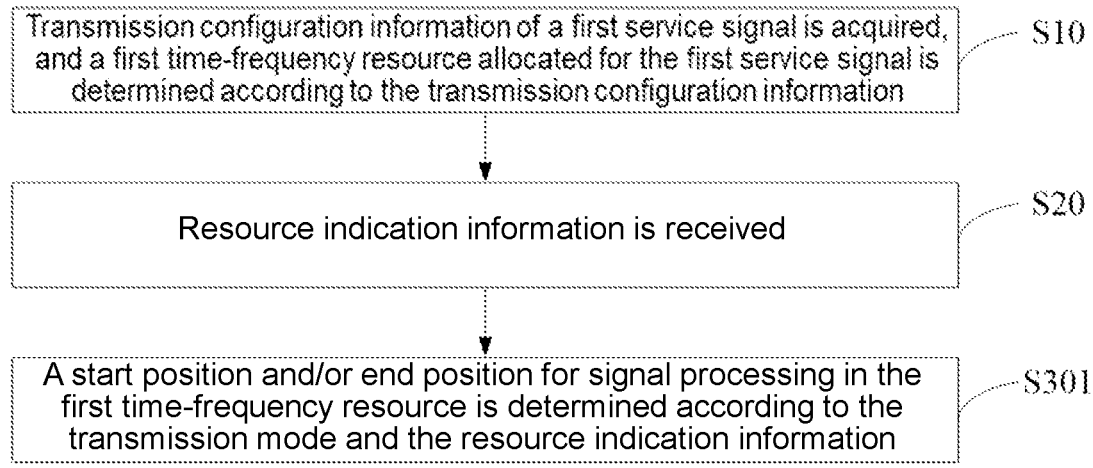
FIG. 6 is a schematic flowchart of another exemplary embodiment of a signal transmission method according to the invention.

Referring to FIG. 6, FIG. 6 is a schematic flowchart of another exemplary embodiment of a signal transmission method of the invention. As shown in FIG. 6, this embodiment is based on the embodiment shown in FIG. 2, assuming that the signal processing is signal cancel.

Step S30 includes:

S301: A start position and/or end position for signal processing in the first time-frequency resource is determined according to the transmission mode and the resource indication information.

Compared with the above-mentioned embodiment shown in FIG. 2, this embodiment further limits the solution of determining the start position and/or end position for the signal processing through the transmission mode and the second time-frequency resource.

It should be noted that when the channel type is PUSCH or PUCCH, there are multiple transmission modes for the first service signal, such as: no repetition and no frequency hopping mode (that is, normal mode), frequency hopping mode, and repetition mode. The difference in the modes will cause the first time-frequency resource allocated for the first service signal to be different. In order to further ensure the accuracy of signal transmission, in this embodiment, the start position and/or end position for signal cancel in the first time-frequency resource are determined according to the transmission mode and the second time-frequency resource indicated by the resource indication information. That is, when determining the start position and/or end position for signal cancel in the first time-frequency resource, the transmission mode is taken into consideration, and therefore the accuracy of signal transmission can be ensured.

For the non-repetition and non-frequency hopping mode (that is, the normal mode), typically a relatively complete time-frequency resource is allocated. According to the characteristics of the time-frequency resource, in order to ensure the accuracy of signal transmission, in this embodiment, the step S301 may specifically include: when the transmission mode is no repetition and no frequency hopping mode, determining the conflict resource between the first time-frequency resource and the second time-frequency resource indicated by the resource indication information; using the start position of the conflict resource on the first time-frequency resource as the start position for signal processing, and/or using the end position of the first time-frequency resource as the end position for signal processing.

The following three specific examples are used to further illustrate the start position and/or end position for signal processing.

Figure 7A:
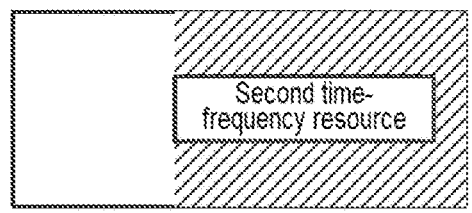
FIG. 7a is a schematic diagram of signal cancel in the first case when the transmission mode is no repetition and no frequency hopping mode in an embodiment of the invention.

Referring to FIG. 7*a*, it is assumed that the large box in the figure is the first time-frequency resource allocated in PUSCH or PUCCH for the first service signal, and the small box is the second time-frequency resource. Under the circumstances, the conflict resource between the first time-frequency resource and the second time-frequency resource is the resource corresponding to the small box. The conflict starts during the transmission of the first service signal and ends before the original end position for transmission of the first service signal. Therefore, the first service signal is canceled from the start position of the resource conflict to the original end position for transmission of the first service signal. That is to say, the area in the first time-frequency resource where signal needs to be cancelled is the part filled with diagonal lines in the large box in FIG. 7*a*.

Figure 7B:
FIG. 7b is a schematic diagram of signal cancel in the second case when the transmission mode is no repetition and no frequency hopping mode in an embodiment of the invention.

Referring to FIG. 7*b*, it is also assumed that the large box in the figure is the first time-frequency resource allocated in PUSCH or PUCCH for the first service signal, and the small box is the second time-frequency resource. Under the circumstances, the conflict resource between the first time-frequency resource and the second time-frequency resource is the resource corresponding to the overlapping part of the large box and the small box. The conflict starts at the position where the transmission of the first service signal starts and ends before the original end position of the transmission of the first service signal. Therefore, the first service signal is cancelled from the conflict start position, that is, the start position for signal transmission, and the cancelling ends at the original end position for the first service signal. Under the circumstances, the transmission of first service signal is completely cancelled. That is, the area in the first time-frequency resource where the signal needs to be cancelled is the whole large box in FIG. 7*b*.

Figure 7C:
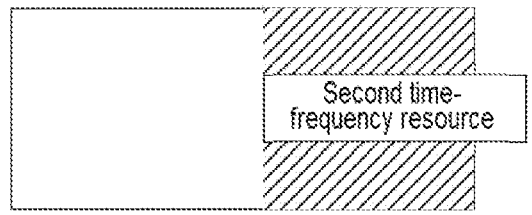
FIG. 7c is a schematic diagram of signal cancel in the third case when the transmission mode is no repetition and no frequency hopping mode in an embodiment of the invention.

Referring to FIG. 7*c*, it is also assumed that the large box in the figure is the first time-frequency resource allocated in PUSCH or PUCCH for the first service signal, and the small box is the second time-frequency resource. Under the circumstances, the conflict resource between the first time-frequency resource and the second time-frequency resource is the resource corresponding to the overlapping part of the large box and the small box. The conflict starts during the transmission of the first service signal and ends at the original end position of the first service signal transmission. Therefore, the first service signal is cancelled from the start position of the resource conflict and ends at the original end position for transmission of the first service signal. That is, the area in the first time-frequency resource where the signal needs to be cancelled is the part filled with diagonal lines in the large box in FIG. 7*c*.

Certainly, after the receiving end receives the first service signal for signal cancel, there may be a problem of decoding failure. Under the circumstances, the mobile terminal can be required to retransmit data, that is, the entire first service signal or a part of the first service signal where the signal is cancelled can be retransmitted according to the configuration or protocol.

For the frequency hopping mode, the mode usually allocates time-frequency resources consisting of at least two narrow-frequency carriers. In view of the characteristics of the time-frequency resources, in order to ensure the accuracy of signal transmission, in this embodiment, step S301 may specifically include: when the transmission mode is the frequency hopping mode, determining the conflict resource between the first time-frequency resource and the second time-frequency resource indicated by the resource indication information, and using the frequency hopping resource where the conflict resource is located in the first time-frequency resource as the current frequency hopping resource; using the start position of the conflict resource on the current frequency hopping resource as the start position for signal processing, and/or using the end position of the current frequency hopping resource as the end position for signal processing.

The following three specific examples are used to further illustrate the start position and/or end position for signal processing.

Figure 8A:
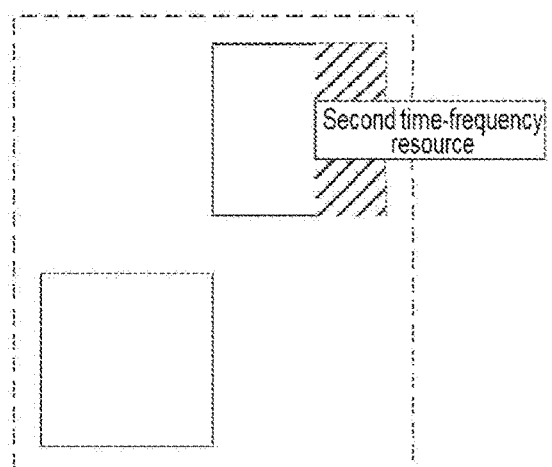
FIG. 8a is a schematic diagram of signal cancel in the first case when the transmission mode is a frequency hopping mode in an embodiment of the invention.

Referring to FIG. 8*a*, it is assumed that the two square boxes (i.e., frequency hopping resources) in the box with dashed lines in the figure are the first time-frequency resource allocated for the first service signal in the PUSCH or PUCCH, and the box is the second time-frequency resource. Under the circumstances, the conflict resource between the first time-frequency resource and the second time-frequency resource is the resource corresponding to the overlapping part of the square box on the right (that is, the current frequency hopping resource) and the box. The first service signal is cancelled from the start position of the conflict resource and ends at the end position of the current frequency hopping resource. Therefore, the area in the first time-frequency resource where the signal needs to be cancelled is the part filled with diagonal lines in the square box on the right in FIG. 8*a*.

Figure 8B:
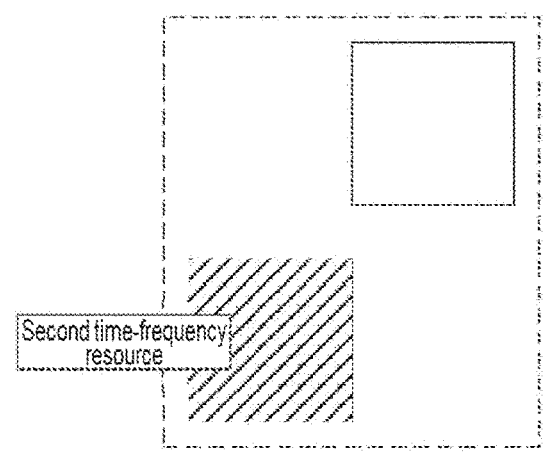
FIG. 8b is a schematic diagram of signal cancel in the second case when the transmission mode is a frequency hopping mode in an embodiment of the invention.

Referring to FIG. 8*b*, it is also assumed that the two square boxes (i.e., frequency hopping resources) in the box with dashed lines in the figure are the first time-frequency resource allocated for the first service signal in the PUSCH or PUCCH, and the box is the second time-frequency resource. Under the circumstances, the conflict resource between the first time-frequency resource and the second time-frequency resource is the resource corresponding to the overlapping part of the square box on the left (that is, the current frequency hopping resource) and the box. The first service signal is cancelled from the start position of the conflict resource and ends at the end position of the current frequency hopping resource. Therefore, the area in the first time-frequency resource where the signal needs to be cancelled is the part filled with diagonal lines in the square box on the left in FIG. 8*b*.

Figure 8C:
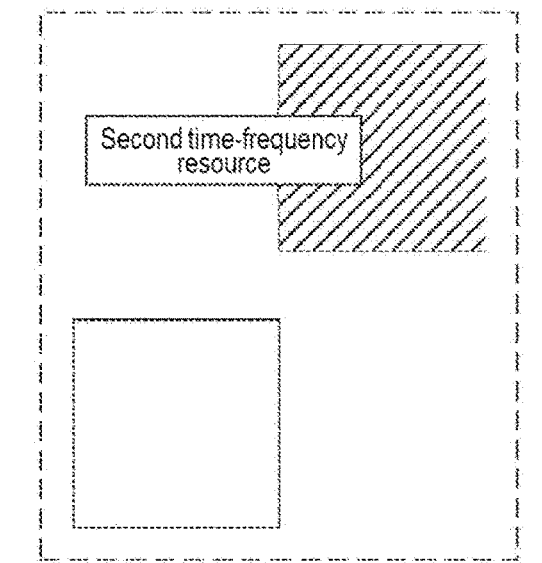
FIG. 8c is a schematic diagram of signal cancel in the third case when the transmission mode is a frequency hopping mode in an embodiment of the invention.

Referring to FIG. 8*c*, it is also assumed that the two square boxes (i.e., frequency hopping resources) in the box with dashed lines in the figure are the first time-frequency resource allocated for the first service signal in the PUSCH or PUCCH, and the box is the second time-frequency resource. Under the circumstances, the conflict resource between the first time-frequency resource and the second time-frequency resource is the resource corresponding to the overlapping part of the square box on the right (that is, the current frequency hopping resource) and the box. The first service signal is cancelled from the start position of the conflict resource and ends at the end position of the current frequency hopping resource. Therefore, the area in the first time-frequency resource where the signal needs to be cancelled is the part filled with diagonal lines in the square box on the right in FIG. 8*c*.

Certainly, after the receiving end receives the first service signal for signal cancel, there may be a problem of decoding failure. Under the circumstances, the mobile terminal can be required to retransmit data, that is, the entire first service signal or a part of the first service signal where the signal is cancelled can be retransmitted according to the configuration or protocol.

It is understandable that since the frequency hopping mode allocates time-frequency resources composed of at least two narrow-band carriers, and the frequency bands corresponding to the narrow-band carriers are normally different, it can minimize the part where signal is cancelled, thus ensuring a certain level of accuracy of signal analysis.

In terms of the repetition mode, normally multiple time-frequency resources with the same frequency band are allocated. In view of the characteristics of the time-frequency resources, in order to ensure the accuracy of signal transmission, in this embodiment, step S301 may specifically include:

When the transmission mode is the repetition mode, two methods are used to determine the start position and/or the end position for the signal processing in the first time-frequency resource.

The first method is: determining the conflict resource between the first time-frequency resource and the second time-frequency resource indicated by the resource indication information, and using the repetitive resource where the conflict resource is located in the first time-frequency resource as a target repetitive resource; using the start position of the conflict resource on the target repetitive resource as the start position for the signal processing, and/or using the end position of the target repetitive resource as the end position for the signal processing.

The second method is: determining the conflict resource between the first time-frequency resource and the second time-frequency resource indicated by the resource indication information; using the start position of the conflict resource on the first time-frequency resource as the start position for the signal processing, and/or using the end position of the first time-frequency resource as the end position for the signal processing.

Certainly, other methods may also be used to determine the start position and/or end position for the signal processing in the first time-frequency resource, which is not limited in this embodiment.

In specific implementation, the configuration of the transmission mode can typically be divided into dynamic configuration and semi-static configuration. After the receiving end receives the first service signal for signal cancel, it will affect the decoding success rate of the receiving end due to the different configuration methods, which leads to a decrease in resource utilization.

For the dynamic configuration method, the count of retransmission repetitions will change due to the change in the quality of the initial transmission. Therefore, for the dynamic configuration method, signal cancel may be performed only on the target repetitive resource with conflict resources, thereby reducing the part where signal is cancelled. That is, in this embodiment, the conflict resource between the first time-frequency resource and the second time-frequency resource indicated by the resource indication information can be determined when the transmission mode is a repetition mode of dynamic configuration. The repetitive resource where the conflict resource is located in the first time-frequency resource is used as the target repetitive resource. The start position of the conflict resource on the target repetitive resource is used as the start position for the signal processing, and/or the end position of the target repetitive resource is used as the end position for the signal processing.

The following three specific examples are used to further illustrate the start position and/or end position for the signal processing.

Figure 9A:
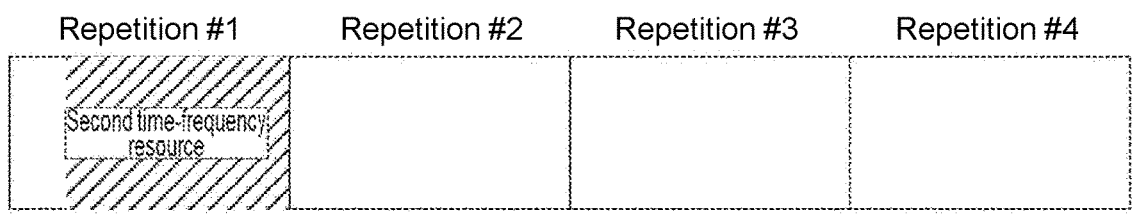
FIG. 9a is a schematic diagram of signal cancel in the first case when the transmission mode is a repetition mode and the configuration mode is a dynamic configuration mode in an embodiment of the invention.

Referring to FIG. 9a, it is assumed that the four large boxes corresponding to repetition #1, repetition #2, repetition #3, and repetition #4 in the figure are all the first time-frequency resources allocated in PUSCH or PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the target repetitive resource (i.e., the large box corresponding to repetition #1). Therefore, the area in the first time-frequency resource where the signal needs to be cancelled is the part filled with diagonal lines in the large box corresponding to repetition #1 in FIG. 9a.

Figure 9B:
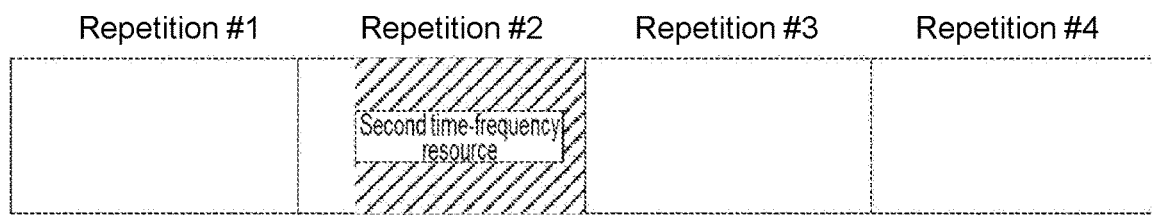
FIG. 9b is a schematic diagram of signal cancel in the second case when the transmission mode is a repetition mode and the configuration mode is a dynamic configuration mode in an embodiment of the invention.

Referring to FIG. 9b, it is assumed that the four large boxes corresponding to repetition #1, repetition #2, repetition #3, and repetition #4 in the figure are all the first time-frequency resources allocated in PUSCH or PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the target repetitive resource (i.e., the large box corresponding to repetition #2). Therefore, the area in the first time-frequency resource where the signal needs to be cancelled is the part filled with diagonal lines in the large box corresponding to repetition #2 in FIG. 9b.

Figure 9C:
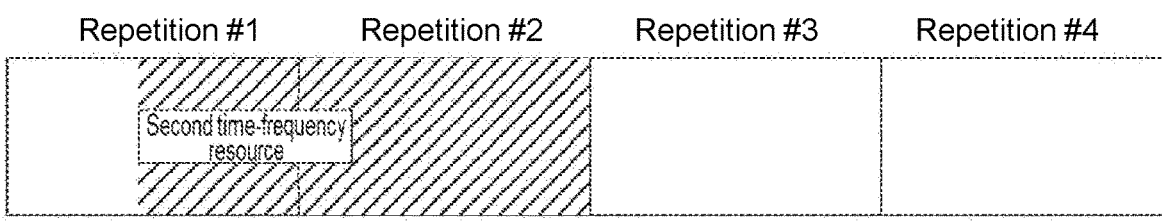
FIG. 9c is a schematic diagram of signal cancel in the third case when the transmission mode is a repetition mode and the configuration mode is a dynamic configuration mode in an embodiment of the invention.

Referring to FIG. 9c, it is assumed that the four large boxes corresponding to repetition #1, repetition #2, repetition #3, and repetition #4 in the figure are all the first time-frequency resources allocated in PUSCH or PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the target repetitive resource (i.e., the two large boxes corresponding to repetition #1 and repetition #2). Therefore, the area in the first time-frequency resource where the signal needs to be cancelled is the part filled with diagonal lines in the two large boxes corresponding to repetition #1 and repetition #2 in FIG. 9c.

Certainly, after the receiving end receives the first service signal for signal cancel, there may be a problem of decoding failure. Under the circumstances, the mobile terminal can be required to retransmit data, that is, the part of the first service signal where the signal is cancelled can be retransmitted according to the configuration or protocol. Since only the part of the first service signal where the signal is cancelled is retransmitted, resources can be saved and resource utilization can be improved.

In terms of the semi-static configuration mode, the amount of repetition of retransmissions will not change due to the change in the reception quality of the initial transmission. During the transmission, if a signal is cancelled, the probability of signal parsing failure will increase, and the probability of retransmission will increase. In this case, more repeated transmission parts can be cancelled, and retransmission can be used to ensure accurate signal transmission. That is, in this embodiment, when the transmission mode is a semi-static configuration repetition mode, the conflict resource between the first time-frequency resource and the second time-frequency resource indicated by the resource indication information is determined; the start position of the conflict resource on the first time-frequency resource is used as the start position for the signal processing, and/or the end position of the first time-frequency resource is used as the end position for the signal processing. The following three specific examples are used to further illustrate the start position and/or end position for the signal processing.

Figure 10A:
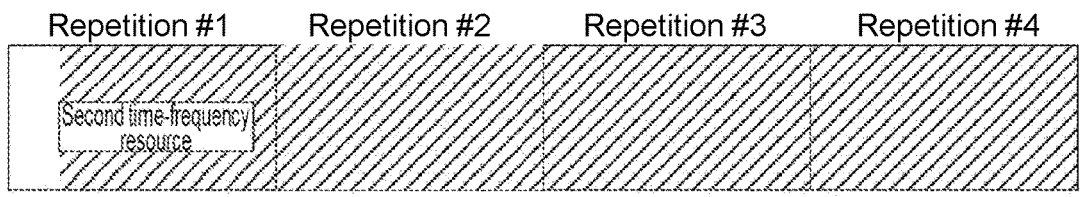
FIG. 10a is a schematic diagram of signal cancel in the first case when the transmission mode is a repetition mode and the configuration mode is a semi-static configuration mode in an embodiment of the invention.

Referring to FIG. 10a, it is assumed that the four large boxes corresponding to repetition #1, repetition #2, repetition #3, and repetition #4 in the figure are all the first time-frequency resources allocated in PUSCH or PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the first time-frequency source. Therefore, the area in the first time-frequency resource where the signal needs to be cancelled is the part filled with diagonal lines in the four large boxes corresponding to repetition #1, repetition #2, repetition #3, and repetition #4 in FIG. 10a.

Figure 10B:
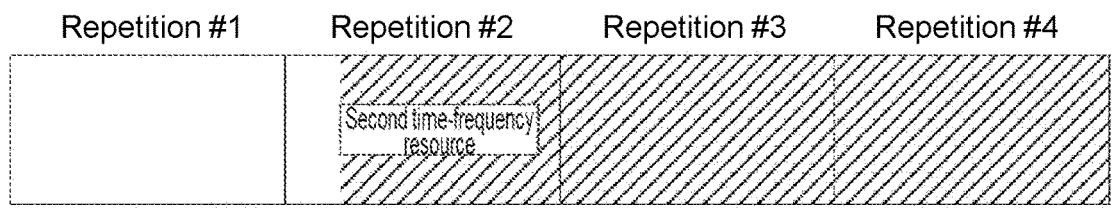
FIG. 10b is a schematic diagram of signal cancel in the second case when the transmission mode is a repetition mode and the configuration mode is a semi-static configuration mode in an embodiment of the invention.

Referring to FIG. 10b, it is assumed that the four large boxes corresponding to repetition #1, repetition #2, repetition #3, and repetition #4 in the figure are all the first time-frequency resources allocated in PUSCH or PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the first time-frequency source. Therefore, the area in the first time-frequency resource where the signal needs to be cancelled is the part filled with diagonal lines in the three large boxes corresponding to repetition #2, repetition #3, and repetition #4 in FIG. 10b.

Figure 10C:
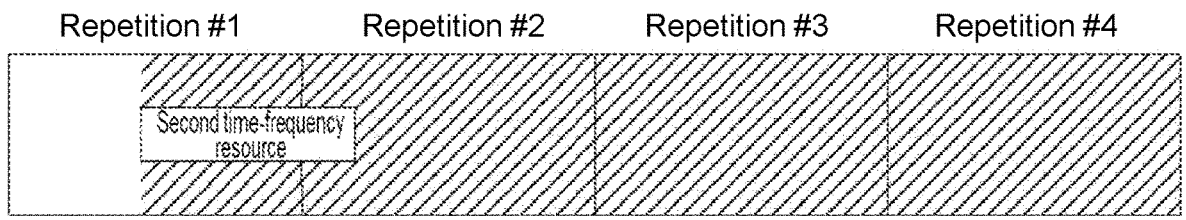
FIG. 10c is a schematic diagram of signal cancel in the third case when the transmission mode is a repetition mode and the configuration mode is a semi-static configuration mode in an embodiment of the invention.

Referring to FIG. 10c, it is assumed that the four large boxes corresponding to repetition #1, repetition #2, repetition #3, and repetition #4 in the figure are all the first time-frequency resources allocated in PUSCH or PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the first time-frequency source. Therefore, the area in the first time-frequency resource where the signal needs to be cancelled is the part filled with diagonal lines in the four large boxes corresponding to repetition #1, repetition #2, repetition #3, and repetition #4 in FIG. 10c.

Certainly, after the receiving end receives the first service signal for signal cancel, there may be a problem of decoding failure. Under the circumstances, the mobile terminal can be required to retransmit data, that is, the first service signal can be retransmitted according to the configuration or protocol.

Figure 11:
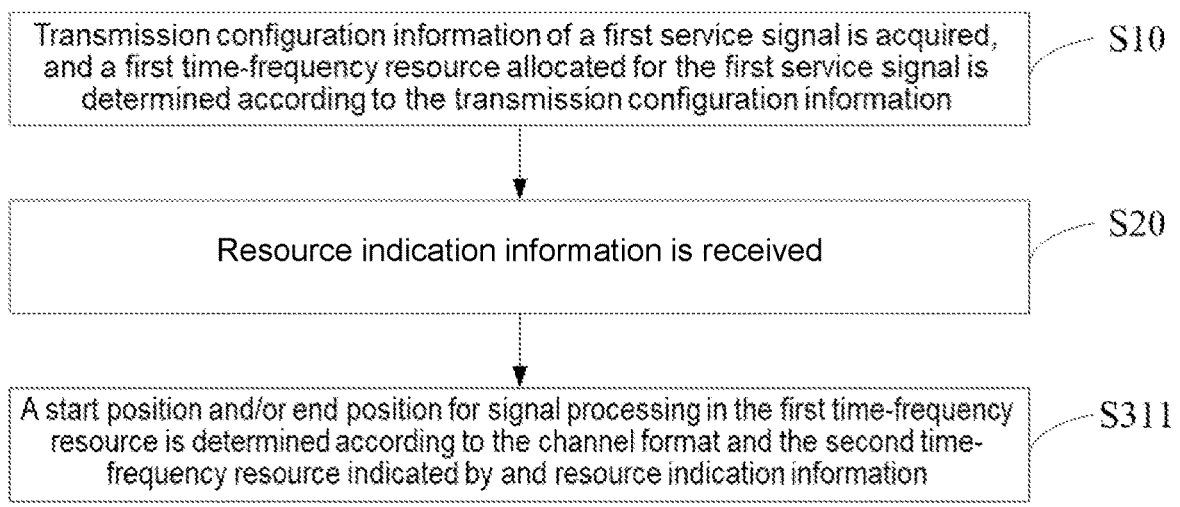
FIG. 11 is a schematic flowchart of another exemplary embodiment of a signal transmission method according to the invention.

Referring to FIG. 11, FIG. 11 is a schematic flowchart of another exemplary embodiment of a signal transmission method according to the invention. As shown in FIG. 11, this embodiment is based on the embodiment shown in FIG. 2 above, assuming that the signal processing is signal cancel.

Step S30 includes:

S311: A start position and/or end position for signal processing in the first time-frequency resource is determined according to the channel format and the second time-frequency resource indicated by and resource indication information.

Compared with the embodiment shown in FIG. 2 above, this embodiment further limits the channel type as a solution for determining the start position and/or end position for signal processing according to the channel format and the second time-frequency resource indicated by the resource indication information.

It should be noted that when the channel type is PUCCH, since the repetition mode of PUCCH is typically semi-static configuration, that is, the count of repetitions during retransmission will not change due to the change in the reception quality of the initial transmission, the transmission can be cancelled when conflicts are encountered in the repetition mode, so that resources can be saved for other data transmission.

However, different channel formats are distinguished from each other. For example, when the channel format is PUCCH format 0/1, if the count of transmissions is insufficient, the probability of error detection will increase significantly. However, due to the lack of cyclic redundancy check (CRC), the detection result is not trustworthy for the base station, which leads to UCI parsing errors. When the channel format is PUCCH format 2/3/4, since there is the cyclic redundancy check (CRC), the base station can determine whether the reception is accurate through the CRC check. Although the count of transmissions is insufficient, resulting in an increase in the probability of error detection, the base station can determine whether the detection result is accurate, and UCI parsing errors will not occur.

Therefore, for different channel formats, different methods are needed to determine the start position and/or end position for signal cancel.

When the channel format is PUCCH format 0/1, such signal format does not have cyclic redundancy check (CRC), and therefore the detection result is not trustworthy for the base station. Accordingly, in the embodiment, when the signal format is a signal format without cyclic redundancy check (CRC), the conflict resource between the first time-frequency resource and the second time-frequency resource indicated by the resource indication information may be determined; the start position of the conflict resource on the first time-frequency resource is used as the start position for the signal processing, and/or the end position of the first time-frequency resource is used as the end position for the signal processing.

The following three specific examples are used to further illustrate the start position and/or end position for the signal processing.

For this embodiment, the process of determining the start position and/or the end position for signal processing in the first time-frequency resource is substantially the same as the determining process where the transmission mode is a repetition mode and the configuration mode is a semi-static configuration mode. Therefore, the examples in this embodiment can be derived from the corresponding drawings.

Referring to FIG. 10a again, it is assumed that the four large boxes corresponding to repetition #1, repetition #2, repetition #3, and repetition #4 in the figure are all the first time-frequency resources allocated in PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the first time-frequency source. Therefore, the area in the first time-frequency resource where the signal needs to be cancelled is the part filled with diagonal lines in the four large boxes corresponding to repetition #1, repetition #2, repetition #3, and repetition #4 in FIG. 10a.

Referring to FIG. 10b again, it is assumed that the four large boxes corresponding to repetition #1, repetition #2, repetition #3, and repetition #4 in the figure are all the first time-frequency resources allocated in PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the first time-frequency source. Therefore, the area in the first time-frequency resource where the signal needs to be cancelled is the part filled with diagonal lines in the three large boxes corresponding to repetition #2, repetition #3, and repetition #4 in FIG. 10b.

Referring to FIG. 10c again, it is assumed that the four large boxes corresponding to repetition #1, repetition #2, repetition #3, and repetition #4 in the figure are all the first time-frequency resources allocated in PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the first time-frequency source. Therefore, the area in the first time-frequency resource where the signal needs to be cancelled is the part filled with diagonal lines in the four large boxes corresponding to repetition #1, repetition #2, repetition #3, and repetition #4 in FIG. 10c.

Certainly, after the receiving end receives the first service signal for signal cancel, there may be a problem of decoding failure. Under the circumstances, the mobile terminal can be required to retransmit data, that is, the first service signal can be retransmitted according to the configuration or protocol.

In terms of the channel format PUCCH format 2/3/4, such signal formats have cyclic redundancy check (CRC). Therefore, it is beneficial for PUCCH reception to have as much PUCCH formats 2/3/4 as possible. Accordingly, for PUCCH formats 2/3/4, it is possible to cancel only the transmission of a certain repetitive part. Therefore, in this embodiment, when the signal format is a signal format with a cyclic redundancy check (CRC), the conflict resource between the first time-frequency resource and the second time-frequency resource is determined, and the repetitive resource where the conflict resource is located in the first time-frequency resource is used as the target repetitive resource. The start position of the conflict resource on the target repetitive resource is used as the start position for the signal cancel, and the end position of the target repetitive resource is used as the end position for the signal cancel.

The following three specific examples are used to further illustrate the start position and/or end position for the signal cancel.

For this embodiment, the process of determining the start position and/or the end position for signal cancel in the first time-frequency resource is substantially the same as the determining process where the transmission mode is a repetition mode and the configuration mode is a dynamic configuration mode. Therefore, the examples in this embodiment can be derived from the corresponding drawings.

Referring to FIG. 9a, it is assumed that the four large boxes corresponding to repetition #1, repetition #2, repetition #3, and repetition #4 in the figure are all the first time-frequency resources allocated in PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the target repetitive resource (i.e., the large box corresponding to repetition #1). Therefore, the area in the first time-frequency resource where the signal needs to be cancelled is the part filled with diagonal lines in the large box corresponding to repetition #1 in FIG. 9a.

Referring to FIG. 9b again, it is assumed that the four large boxes corresponding to repetition #1, repetition #2, repetition #3, and repetition #4 in the figure are all the first time-frequency resources allocated in PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the target repetitive resource (i.e., the large box corresponding to repetition #2). Therefore, the area in the first time-frequency resource where the signal needs to be cancelled is the part filled with diagonal lines in the large box corresponding to repetition #2 in FIG. 9b.

Referring to FIG. 9c again, it is assumed that the four large boxes corresponding to repetition #1, repetition #2, repetition #3, and repetition #4 in the figure are all the first time-frequency resources allocated in PUCCH for the first service signal. The small box is the second time-frequency resource. Under the circumstances, the conflict resource between the first time-frequency resource and the second time-frequency resource is the resource corresponding to the small box, and the first service signal is cancelled from the start position of the conflict resource, and ends at the end position of the target repetitive resource (i.e., the two large boxes corresponding to repetition #1 and repetition #2). Therefore, the area in the first time-frequency resource where the signal needs to be cancelled is the part filled with diagonal lines in the two large boxes corresponding to repetition #1 and repetition #2 in FIG. 9c.

Certainly, after the receiving end receives the first service signal for signal cancel, there may be a problem of decoding failure. Under the circumstances, the mobile terminal can be required to retransmit data, that is, the part of the first service signal where the signal is cancelled can be retransmitted according to the configuration or protocol. Since only the part of the first service signal where the signal is cancelled is retransmitted, resources can be saved and resource utilization can be improved.

Figure 12:
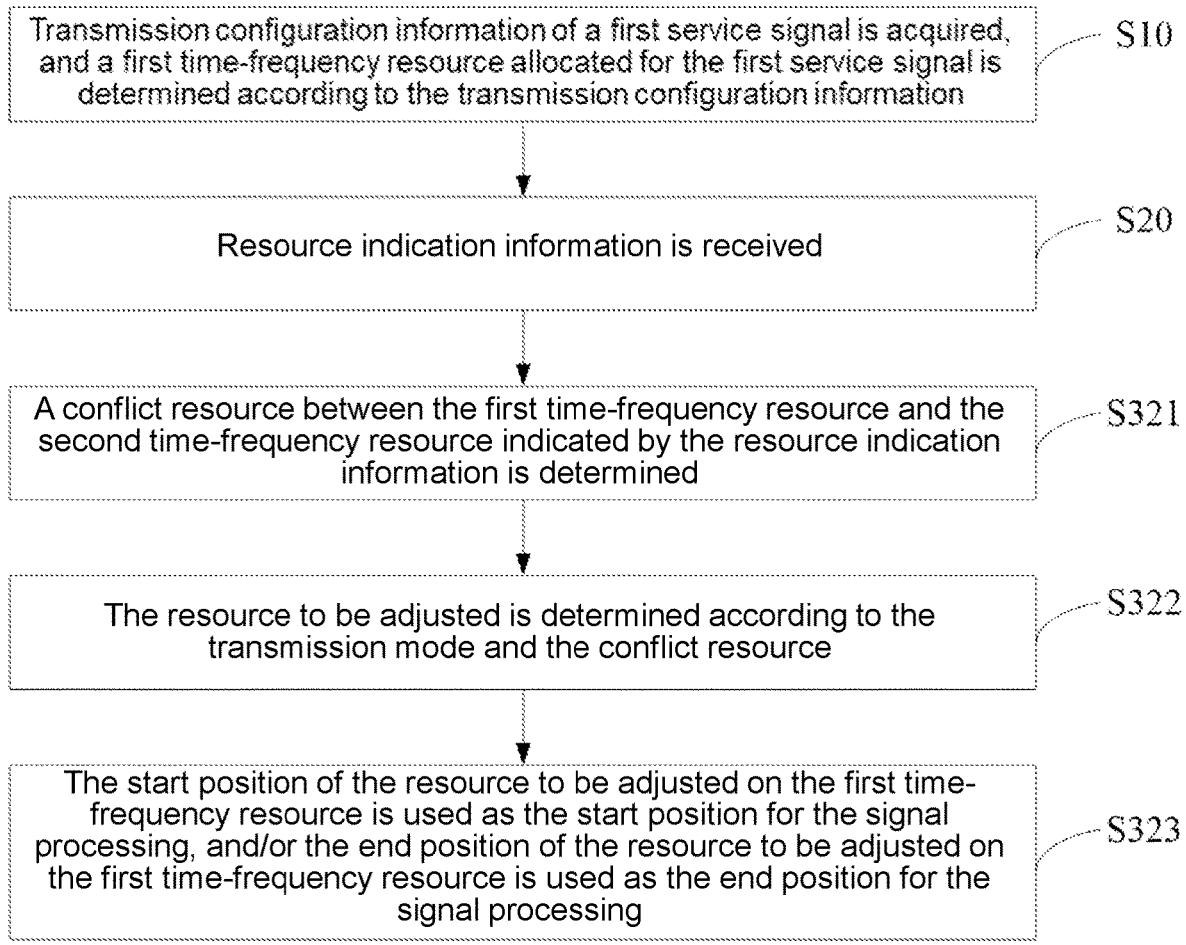
FIG. 12 is a schematic flowchart of still another exemplary embodiment of a signal transmission method according to the invention.

Referring to FIG. 12, FIG. 12 is a schematic flowchart of still another exemplary embodiment of a signal transmission method of the invention. As shown in FIG. 12, this embodiment is based on the embodiment shown in FIG. 2, assuming that the signal processing is signal power adjustment, and the transmission configuration information includes a transmission mode.

Step S30 includes:

S321: A conflict resource between the first time-frequency resource and the second time-frequency resource indicated by the resource indication information is determined.

S322: The resource to be adjusted is determined according to the transmission mode and the conflict resource.

S323: The start position of the resource to be adjusted on the first time-frequency resource is used as the start position for the signal processing, and/or the end position of the resource to be adjusted on the first time-frequency resource is used as the end position for the signal processing.

Compared with the above-mentioned embodiment shown in FIG. 2, this embodiment further limits the solution for determining the start position and/or end position for signal processing during signal power adjustment.

It should be noted that due to the time-frequency resources of different transmission modes, the resource forms are different. In order to avoid waste of energy, it is impossible to adjust the signal power of all the first time-frequency resources. The signal power adjustment needs to be performed on the time-frequency resources where adjustment is required. Therefore, determining the resource to be adjusted according to the transmission mode and conflict resource can effectively determine the start position and/or the end position for signal power adjustment that actually needs to be performed.

In a specific implementation, when the resource to be adjusted is determined according to the transmission mode and the conflict resource, the single continuous resource where the conflict resource is located in the first time-frequency resource may be used as the resource to be adjusted. For example, for the normal mode, the overall first time-frequency resource is regarded as a single continuous resource. For the frequency hopping mode, each frequency hopping resource is regarded as a single continuous resource. For the repetition mode, each repetitive resource is regarded as a single continuous resource.

For the non-repetition and non-frequency hopping mode (that is, the normal mode), it usually allocates a relatively complete time-frequency resource. In view of the characteristics of the time-frequency resource, in order to ensure the accuracy of signal transmission, in this embodiment, step S322 may specifically include: when the transmission mode is a non-repetition and non-frequency hopping mode, using the first time-frequency resource as the resource to be adjusted.

The following two specific examples are used to further illustrate the start position and/or end position for the signal processing.

Figure 13A:
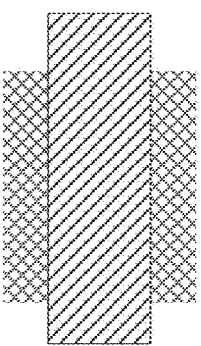
FIG. 13a is a schematic diagram of signal power adjustment in the fourth case when the transmission mode is no repetition and no frequency hopping mode in an embodiment of the invention.
Figure 13B:
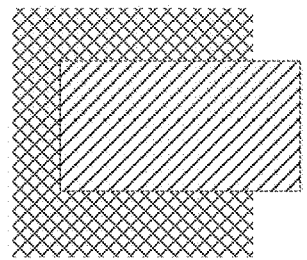
FIG. 13b is a schematic diagram of signal power adjustment in the fifth case when the transmission mode is no repetition and no frequency hopping mode in an embodiment of the invention.

Referring to FIG. 13a and FIG. 13b, it is assumed that the box filled with diagonal lines in the figure is the first time-frequency resource, and the box filled by the grid in the figure is the second time-frequency resource. Under the circumstances, the first time-frequency resource is the resource to be adjusted, that is, the entire first time-frequency resource needs to be subjected to signal power adjustment.

For the frequency hopping mode, the mode usually allocates time-frequency resources consisting of at least two narrow-frequency carriers. In view of the characteristics of the time-frequency resources, in order to ensure the accuracy of signal transmission, in this embodiment, step S322 may specifically include: when the transmission mode is a frequency hopping mode, using the frequency hopping resource where the conflict resource is located in the first time-frequency resource as the resource to be adjusted.

The following two specific examples are used to further illustrate the start position and/or end position for the signal processing.

Figure 14A:
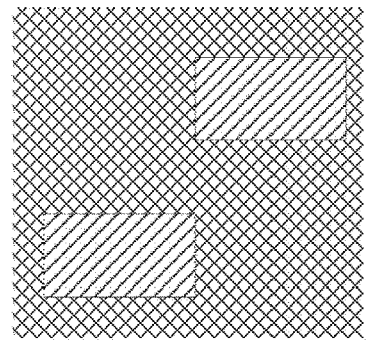
FIG. 14a is a schematic diagram of signal power adjustment in the fourth case when the transmission mode is a frequency hopping mode in an embodiment of the invention.

Referring to FIG. 14a, assume that the two small boxes in the figure are the first time-frequency resources, and the box filled by the grid in the figure is the second time-frequency resource. Under the circumstances, the resources to be adjusted are those boxes filled with diagonal lines.

Figure 14B:
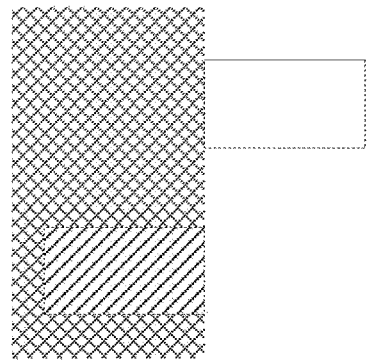
FIG. 14b is a schematic diagram of signal power adjustment in the fifth case when the transmission mode is a frequency hopping mode in an embodiment of the invention.

Referring to FIG. 14b, assume that the two small boxes in the figure are the first time-frequency resources, and the box filled by the grid in the figure is the second time-frequency resource. Under the circumstances, the resource to be adjusted is the box filled with diagonal lines.

In terms of the repetition mode, normally multiple time-frequency resources with the same frequency band are allocated. In view of the characteristics of the time-frequency resources, in order to ensure the accuracy of signal transmission, in this embodiment, step S322 may specifically include: when the transmission mode is a repetition mode, using the repetitive resource where the conflict resource is located in the first time-frequency resource as the resource to be adjusted.

The following three specific examples are used to further illustrate the start position and/or end position for the signal processing.

Figure 15A:
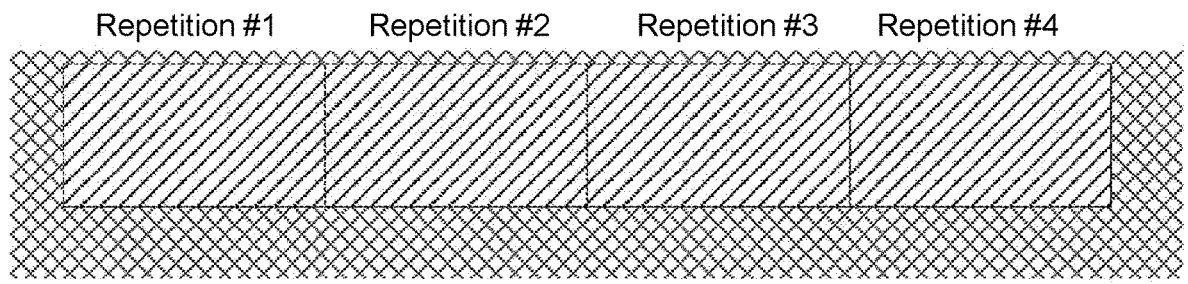
FIG. 15a is a schematic diagram of signal power adjustment in the fourth case when the transmission mode is a repetition mode in an embodiment of the invention.

Referring to FIG. 15a, assume that the four large boxes corresponding to repetition #1, repetition #2, repetition #3, and repetition #4 in the figure are all the first time-frequency resources, and the box filled by the grid in the figure is the second time-frequency resources. Under the circumstances, the resources to be adjusted are boxes corresponding to repetition #1, repetition #2, repetition #3, and repetition #4, that is, the boxes filled with diagonal lines.

Figure 15B:
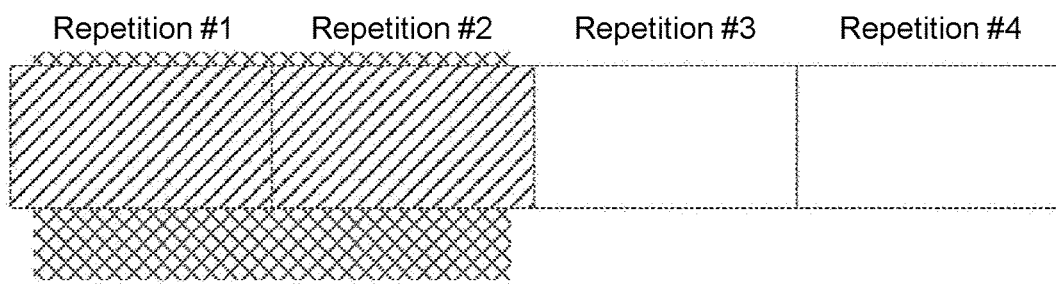
FIG. 15b is a schematic diagram of signal power adjustment in the fifth case when the transmission mode is a repetition mode in an embodiment of the invention.

Referring to FIG. 15b, assume that the four large boxes corresponding to repetition #1, repetition #2, repetition #3, and repetition #4 in the figure are all the first time-frequency resources, and the box filled by the grid in the figure is the second time-frequency resources. Under the circumstances, the resources to be adjusted are boxes corresponding to repetition #1 and repetition #2, that is, the boxes filled with diagonal lines.

Figure 15C:
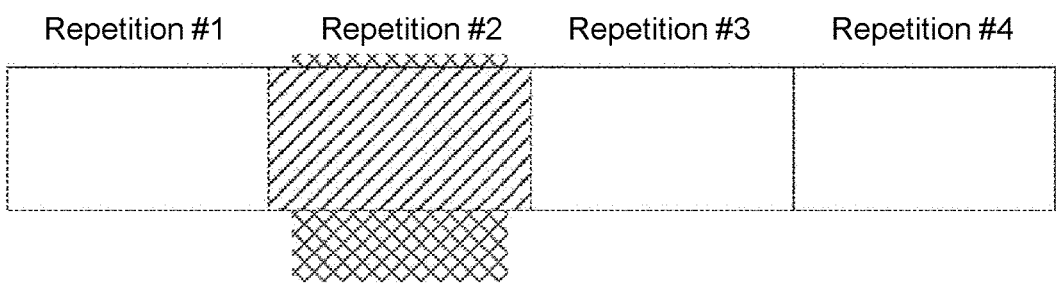
FIG. 15c is a schematic diagram of signal power adjustment in the sixth case when the transmission mode is a repetition mode in an embodiment of the invention.

Referring to FIG. 15c, assume that the four large boxes corresponding to repetition #1, repetition #2, repetition #3, and repetition #4 in the figure are all the first time-frequency resources, and the box filled by the grid in the figure is the second time-frequency resources. Under the circumstances, the resources to be adjusted are the box corresponding to repetition #2, that is, the box filled with diagonal lines.

Figure 16:
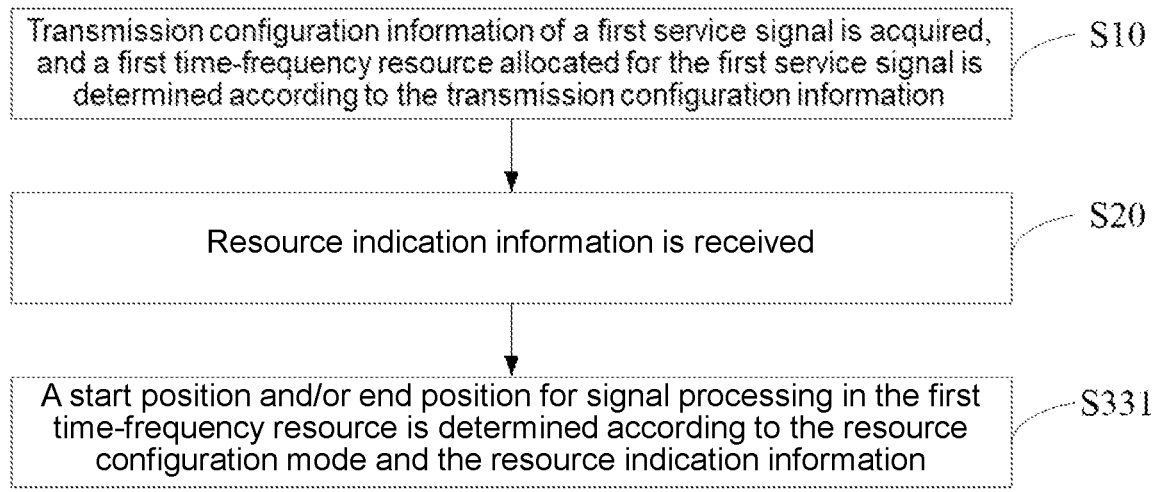
FIG. 16 is a schematic flowchart of yet another exemplary embodiment of a transmission method according to an embodiment of the invention.

Referring to FIG. 16, FIG. 16 is a schematic flowchart of another exemplary embodiment of a signal transmission method according to the invention. As shown in FIG. 16, this embodiment is based on the embodiment shown in FIG. 2.

Step S30 includes:

S331: A start position and/or end position for signal processing in the first time-frequency resource is determined according to the resource configuration mode and the resource indication information.

Compared with the above-mentioned embodiment shown in FIG. 2, this embodiment further limits a solution for determining the start position and/or end position for signal processing through the resource configuration mode and the second time-frequency resource.

In order to better provide periodic services, the concept of pre-configured resources is introduced. The downlink is called semi-persistent scheduling (SPS), and the uplink is called configured grant (CG).

NR supports the transmission of the following two types of uplink configuration authorization.

1. PUSCH Transmission Based on Configured Grant Type 1

Network radio resources control (RRC) to configure all transmission resources and transmission parameters including time domain resources, frequency domain resources, period of time domain resource, modulation and coding strategy (MCS), the count of repetitions, frequency hopping, hybrid automatic repeat request of number of HARQ process, etc. After receiving the RRC configuration, the terminal can immediately use the configured transmission parameters to perform PUSCH transmission on the configured time-frequency resources.

2. PUSCH Transmission Based on Configured Grant Type 2

A two-step resource configuration method is adopted. First, the network RRC configures the transmission resources and transmission parameters including period of time domain resource, number of repetitions, frequency hopping, the number of HARQ processes and so on. The physical downlink control channel PDCCH scrambled by the configuration scheduling wireless network temporary identifier (CS-RNTI) starts the PUSCH transmission based on configured grant Type 2, and is simultaneously configured with other transmission resources and transmission parameters including time domain resources, frequency domain resources, MCS, and so on. When the mobile terminal receives the RRC configuration parameters, it cannot immediately use the resources and parameters configured by the configuration parameters for PUSCH transmission, and must wait for reception of the corresponding PDCCH to start and configure other resources and parameters before PUSCH transmission can be performed.

Assuming that the signal processing is signal cancel. In this embodiment, step S331 may specifically include: when the resource configuration mode is the configured grant CG mode, determining the conflict resource between the first time-frequency resource and the second time-frequency resource indicated by the resource indication information; using the start position of the conflict resource on the first time-frequency resource as the start position for signal processing, and/or using the end position of the first time-frequency resource as the end position for the signal processing.

The following is a specific example for further illustrating the start position and/or end position for the signal processing.

Figure 17:
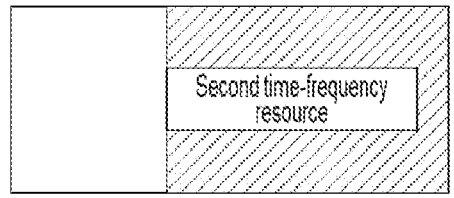
FIG. 17 is a schematic diagram of signal cancel when the resource configuration mode is configured grant (CG) mode and there are resource conflicts in an embodiment of the invention.

Referring to FIG. 17, assuming that the resource configuration mode is the configured grant (CG) mode. The large box in the figure is the first time-frequency resource allocated for the first service signal, and the small box is the second time-frequency resource. Under the circumstances, the conflict resource between the first time-frequency resource and the second time-frequency resource is the resource corresponding to the small box. The conflict starts during the transmission of the first service signal and ends before the original end position for transmission of the first service signal. Therefore, the first service signal is cancelled from the start position of the resource conflict and ends at the original end position for transmission of the first service signal. That is, the area in the first time-frequency resource where the signal needs to be cancelled is the part filled with diagonal lines in the large box in FIG. 17.

The method for the base station to schedule resources for the mobile terminal can also be dynamic grant (DG). Specifically, the mobile terminal can request resources from the base station through scheduling request (SR)/buffer status report (BSR), and the base station issues a dynamic grant through the Uu interface. The dynamic scheduling is carried through PDCCH. The mobile terminal detects the PDCCH and decodes the control information (such as downlink control information (DCI)) carried by the PDCCH to acquire the transmission resources scheduled by the base station.

In this embodiment, step S331 may specifically include: when the resource configuration mode is a dynamic grant (DG) mode and the first time-frequency resource conflicts with the second time-frequency resource indicated by the resource indication information, no signal processing is performed on the transmission on the first time-frequency resource.

The following is a specific example for further illustrating the case where this example does not perform signal processing.

Figure 18:
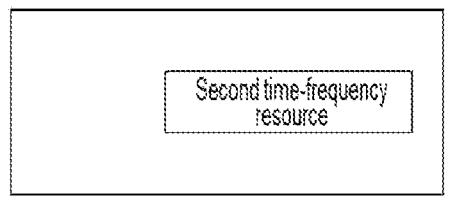
FIG. 18 is a schematic diagram of not performing signal cancel processing when the resource configuration mode is dynamic grant (DG) mode and there are resource conflicts in an embodiment of the invention.

Referring to FIG. 18, assuming that the resource configuration mode is the dynamic grant (DG) mode, the large box in the figure is the first time-frequency resource allocated in the PUSCH or PUCCH for the first service signal, and the small box is the second time-frequency resource. The conflict resource between the first time-frequency resource and the second time-frequency resource is the resource corresponding to the small box. In this case, no signal processing is performed on the transmission on the first time-frequency resource.

Figure 19:
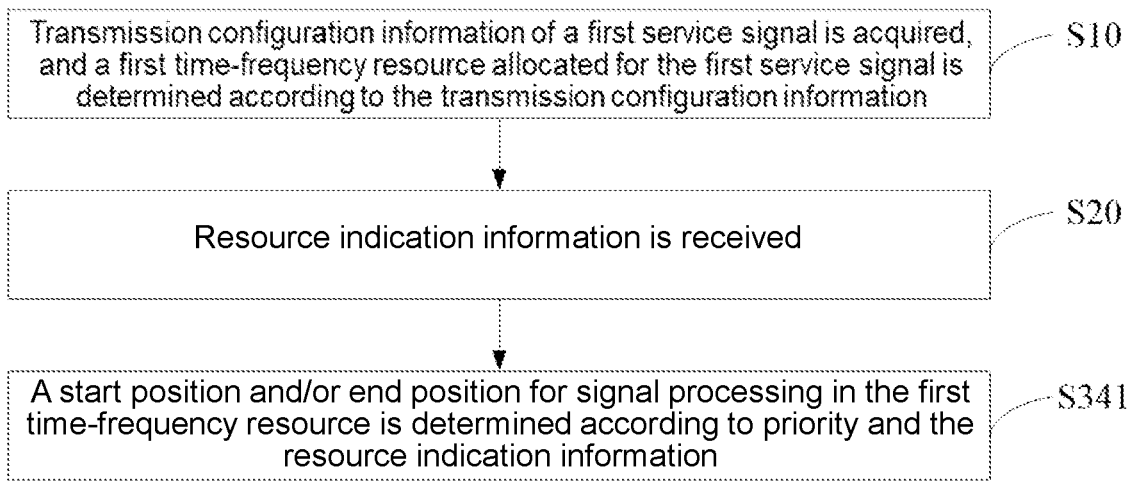
FIG. 19 is a schematic flowchart of yet another exemplary embodiment of a transmission method according to an embodiment of the invention.

Referring to FIG. 19, FIG. 19 is a schematic flowchart of another exemplary embodiment of a signal transmission method according to the invention. As shown in FIG. 16, this embodiment is based on the embodiment shown in FIG. 2.

Step S30 includes:
S341: A start position and/or end position for signal processing in the first time-frequency resource is determined according to priority and the resource indication information.

Compared with the embodiment shown in FIG. 2, this embodiment further limits the solution of determining the start position and/or end position for the signal processing through the priority, the resource configuration mode and the second time-frequency resource.

In this embodiment, step S341 may specifically include: when the priority is the first priority and the first time-frequency resource conflicts with the second time-frequency resource indicated by the resource indication information, no signal processing is performed on the transmission on the first time-frequency resource.

The following is a specific example for further illustrating the case where this example does not perform signal processing.

Figure 20:
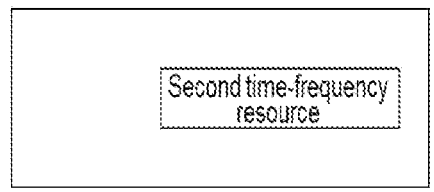
FIG. 20 is a schematic diagram of not performing signal cancel processing when the priority is the first priority and there are resource conflicts in an embodiment of the invention.

Referring to FIG. 20, assuming that the priority is the first priority, the large box in the figure is the first time-frequency resource allocated for the first service signal in the PUSCH or PUCCH, and the small box is the second time-frequency resource. Under the circumstances, the conflict resource between the first time-frequency resource and the second time-frequency resource is the resource corresponding to the small box. Therefore, no signal processing is performed on the transmission on the first time-frequency resource.

In this embodiment, step S341 may specifically include: when the priority is the second priority, determining the conflict resource between the first time-frequency resource and the second time-frequency resource indicated by the resource indication information, and the second priority is lower than the first priority; using the start position of the conflict resource on the first time-frequency resource as the start position for the signal processing, and/or using the end position of the first time-frequency resource as the end position for the signal processing.

The following is a specific example for further illustrating the start position and/or end position for the signal processing.

Figure 21:
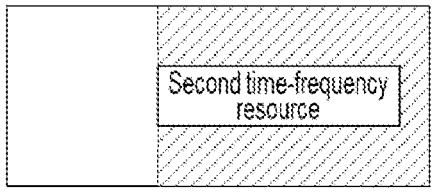
FIG. 21 is a schematic diagram of signal cancel when the priority is the second priority and there are resource conflicts in an embodiment of the invention.

Referring to FIG. 21, assuming that the priority is the second priority, the large box in the figure is the first time-frequency resource allocated for the first service signal, and the small box is the second time-frequency resource. Under the circumstances, the conflict resource between the first time-frequency resource and the second time-frequency resource is the resource corresponding to the small box. The conflict starts during the transmission of the first service signal and ends before the original end position for transmission of the first service signal. Therefore, the first service signal is cancelled from the start position of the resource conflict and ends at the original end position for transmission of the first service signal. In other words, the area in the first time-frequency resource where the signal needs to be cancelled is the part filled with diagonal lines in the large box in FIG. 21.

Figure 22:
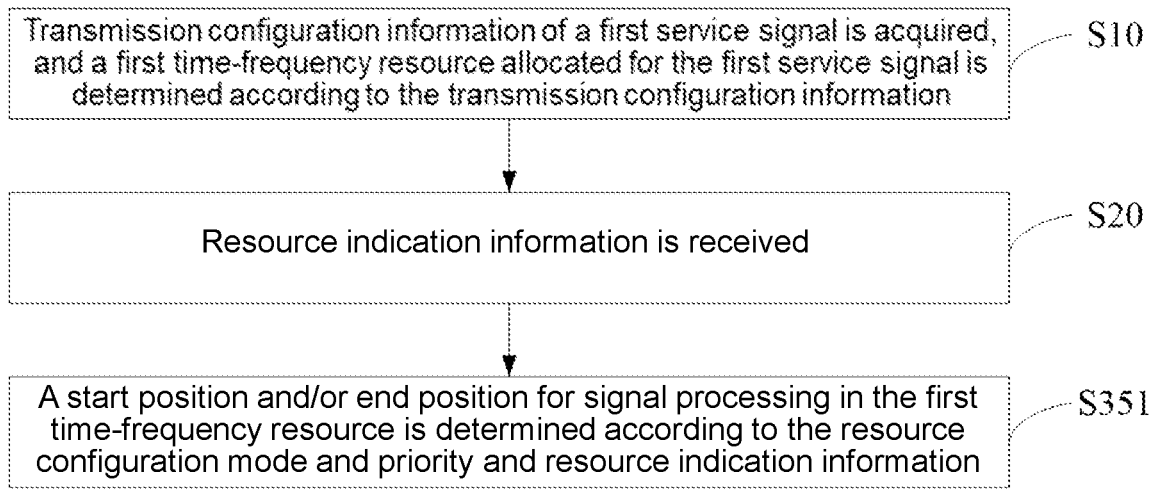
FIG. 22 is a schematic flowchart of still another exemplary embodiment of a transmission method according to an embodiment of the invention.

Referring to FIG. 22, FIG. 22 is a schematic flowchart of another exemplary embodiment of a signal transmission method according to the invention. As shown in FIG. 16, this embodiment is based on the embodiment shown in FIG. 2.

Step S30 includes:
S351: A start position and/or end position for signal processing in the first time-frequency resource is determined according to the resource configuration mode, priority and resource indication information.

Compared with the above-mentioned embodiment shown in FIG. 2, this embodiment further limits the solution of determining the start position and/or end position for signal processing through the resource configuration mode, priority and the second time-frequency resource.

In this embodiment, step S341 may specifically include: when the resource configuration mode is the DG mode, the priority is the first priority, and when the first time-frequency resource conflicts with the second time-frequency resource indicated by the resource indication information, no signal processing is performed on the transmission on the first time-frequency resource.

The following is a specific example for further illustrating the case where this example does not perform signal processing.

Figure 23:
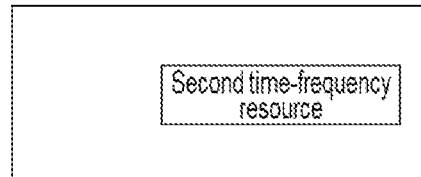
FIG. 23 is a schematic diagram of not performing signal cancel processing when the resource configuration mode is the DG mode, the priority is the first priority, and there are resource conflicts in an embodiment of the invention.

Referring to FIG. 23, assuming that the resource configuration mode is DG mode and the priority is the first priority, the large box in the figure is the first time-frequency resource allocated in PUSCH or PUCCH for the first service signal, and the small box is the second time-frequency resource. The conflict resource between the first time-frequency resource and the second time-frequency resource is the resource corresponding to the small box. Under the circumstances, no signal processing is performed on the transmission on the first time-frequency resource.

In this embodiment, step S341 may specifically include: when the resource configuration mode is the DG mode, and the priority is the second priority, determining the conflict resource between the first time-frequency resource and the second time-frequency resource indicated by the resource indication information, and the second priority is lower than the first priority; using the start position of the conflict resource on the first time-frequency resource as the start position for the signal processing, and/or using the end position of the first time-frequency resource as the end position for the signal processing.

The following is a specific example for further illustrating the start position and/or end position for the signal processing.

Figure 24:
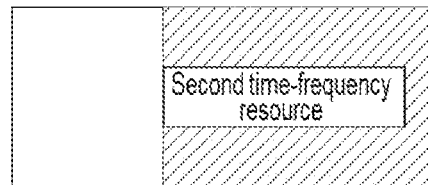
FIG. 24 is a schematic diagram of signal cancel when the resource configuration mode is the DG mode, the priority is the second priority and there are resource conflicts in an embodiment of the invention.

Referring to FIG. 24, assuming that the resource configuration mode is DG mode and the priority is the second priority, the large box in the figure is the first time-frequency resource allocated for the first service signal, and the small box is the second time-frequency resource. Under the circumstances, the conflict resource between the first time-frequency resource and the second time-frequency resource is the resource corresponding to the small box. The conflict starts during the transmission of the first service signal and ends before the original end position for transmission of the first service signal. Therefore, the first service signal is cancelled from the start position of the resource conflict and ends at the original end position for transmission of the first service signal. That is, the area in the first time-frequency resource where signal needs to be cancelled is the part filled with diagonal lines in the large box in FIG. 24.

In this embodiment, step S341 may specifically include: when the resource configuration mode is the DG mode, and the priority is the first priority or the second priority, determining the conflict resource between the first time-frequency resource and the second time-frequency resource indicated by the resource indication information, and the second priority is lower than the first priority; using the start position of the conflict resource on the first time-frequency resource as the start position for the signal processing, and/or using the end position of the first time-frequency resource as the end position for the signal processing.

The following is a specific example for further illustrating the start position and/or end position for the signal processing.

Figure 25:
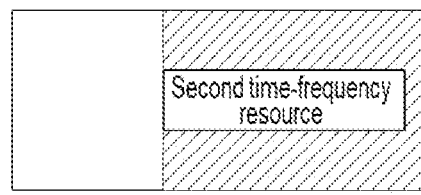
FIG. 25 is a schematic diagram of signal cancel when the resource configuration mode is the DG mode, the priority is the first priority or the second priority, and there are resources conflicts in an embodiment of the invention.

Referring to FIG. 25, assuming that the resource configuration mode is DG mode, the priority is the first priority or the second priority, the large box in the figure is the first time-frequency resource allocated for the first service signal, and the small box is the second time-frequency resource. Under the circumstances, the conflict resource between the first time-frequency resource and the second time-frequency resource is the resource corresponding to the small box. The conflict starts during the transmission of the first service signal, and ends before the original end position for transmission of the first service signal. Therefore, the first service signal is cancelled from the start position of the resource conflict and ends at the original end position for transmission of the first service signal. That is, the area in the first time-frequency resource where the signal needs to be cancelled is the part filled with diagonal lines in the large box in FIG. 25.

In this embodiment, step S341 may specifically include: when the resource configuration mode is the DG mode, the priority is the first priority or the second priority, and when the first time-frequency resource conflicts with the second time-frequency resource indicated by the resource indication information, no signal processing is performed on the transmission on the first time-frequency resource, and the second priority is lower than the first priority.

The following is a specific example for further illustrating the case where this example does not perform signal processing.

Figure 26:
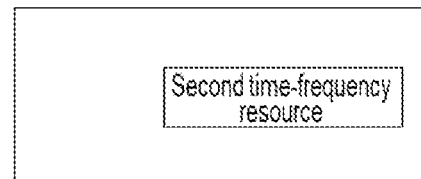
FIG. 26 is a schematic diagram of not performing signal cancel processing when the resource configuration mode is the DG mode, the priority is the first priority or the second priority, and there are resource conflicts in an embodiment of the invention.

Referring to FIG. 26, assuming that the resource configuration mode is DG mode, and the priority is the first priority or the second priority. The large box in the figure is the first time-frequency resource allocated in the PUSCH or PUCCH for the first service signal, and the small box is the second time-frequency resource. The conflict resource between the first time-frequency resource and the second time-frequency resource is the resource corresponding to the small box. Under the circumstances, no signal processing is performed on the transmission on the first time-frequency resource.

In this embodiment, step S341 may specifically include: when the resource configuration mode is the CG mode, the priority is the first priority, and when the first time-frequency resource conflicts with the second time-frequency resource indicated by the resource indication information, no signal processing is performed on the transmission on the first time-frequency resource.

The following is a specific example for further illustrating the case where this example does not perform signal processing.

Figure 27:
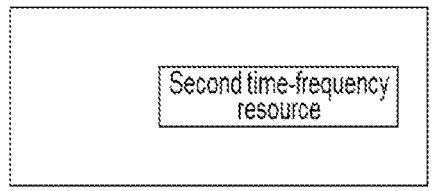
FIG. 27 is a schematic diagram of not performing signal cancel processing when the resource configuration mode is the CG mode, the priority is the first priority and there are resource conflicts in an embodiment of the invention.

Referring to FIG. 27, assuming that the resource configuration mode is CG mode, the priority is the first priority. The large box in the figure is the first time-frequency resource allocated for the first service signal in the PUSCH or PUCCH, and the small box is the second time-frequency resource. The conflict resource between the first time-frequency resource and the second time-frequency resource is the resource corresponding to the small box. Under the circumstances, no signal processing is performed on the transmission on the first time-frequency resource.

In this embodiment, step S341 may specifically include: when the resource configuration mode is the CG mode, and the priority is the second priority, determining the conflict resource between the first time-frequency resource and the second time-frequency resource indicated by the resource indication information; using the start position of the conflict resource on the first time-frequency resource as the start position for the signal processing, and/or using the end position of the first time-frequency resource as the end position for the signal processing.

The following is a specific example for further illustrating the start position and/or end position for the signal processing.

Figure 28:
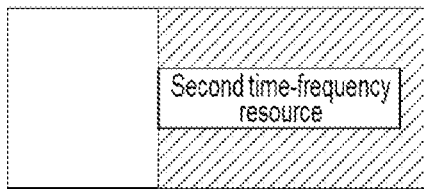
FIG. 28 is a schematic diagram of not performing signal cancel processing when the resource configuration mode is CG mode, the priority is the second priority, and there are resource conflicts in an embodiment of the invention.

Referring to FIG. 28, assuming that the resource configuration mode is CG mode, the priority is the second priority. The large box in the figure is the first time-frequency resource allocated for the first service signal, and the small box is the second time-frequency resource. Under the circumstances, the conflict resource between the first time-frequency resource and the second time-frequency resource is the resource corresponding to the small box. The conflict starts during the transmission of the first service signal, and ends before the original end position for transmission of the first service signal. Therefore, the first service signal is cancelled from the start position of the resource conflict and ends at the original end position for transmission of the first service signal. That is, the area in the first time-frequency resource where signal needs to be cancelled is the part filled with diagonal lines in the large box in FIG. 28.

In this embodiment, step S341 may specifically include: when the resource configuration mode is the CG mode, and the priority is the first priority or the second priority, determining the conflict resource between the first time-frequency resource and the second time-frequency resource indicated by the resource indication information, and the second priority is lower than the first priority; using the starting position of the conflict resource on the first time-frequency resource as the start position, and/or using the end position of the first time-frequency resource as the end position for the signal processing.

The following is a specific example for further illustrating the start position and/or end position for the signal processing.

Figure 29:
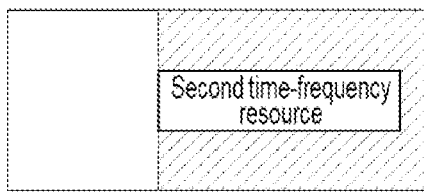
FIG. 29 is a schematic diagram of signal cancel when the resource configuration mode is the CG mode, the priority is the first priority or the second priority, and there are resource conflicts in an embodiment of the invention.

Referring to FIG. 29, assuming that the resource configuration mode is CG mode, the priority is the first priority or the second priority. The large box in the figure is the first time-frequency resource allocated for the first service signal, and the small box is the second time-frequency resource. Under the circumstances, the conflict resource between the first time-frequency resource and the second time-frequency resource is the resource corresponding to the small box. The conflict starts during the transmission of the first service signal, and ends before the original end position for transmission of the first service signal. Therefore, the first service signal is cancelled from the start position of the resource conflict and ends at the original end position for transmission of the first service signal. That is, the area in first time-frequency resource where the signal needs to be cancelled is the part filled with diagonal lines in the large box in FIG. 29.

In this embodiment, step S341 may specifically include: when the resource configuration mode is the CG mode, the priority is the first priority or the second priority, and when the first time-frequency resource conflicts with the second time-frequency resource indicated by the resource indication information, no signal processing is performed on the transmission on the first time-frequency resource, and the second priority is lower than the first priority.

The following is a specific example for further illustrating the case where this example does not perform signal processing.

Figure 30:
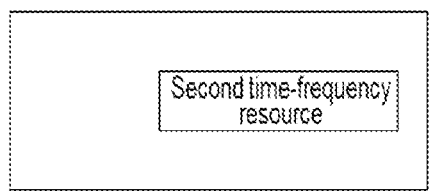
FIG. 30 is a schematic diagram of not performing signal cancel processing when the resource configuration mode is CG mode, the priority is the first priority or the second priority, and there are resource conflicts in an embodiment of the invention.

Referring to FIG. 30, assuming that the resource configuration mode is CG mode, and the priority is the first priority or the second priority. The large box in the figure is the first time-frequency resource allocated in the PUSCH or PUCCH for the first service signal, and the small box is the second time-frequency resource. The conflict resource between the first time-frequency resource and the second time-frequency resource is the resource corresponding to the small box. Under the circumstances, no signal processing is performed on the transmission on the first time-frequency resource.

Figure 31:
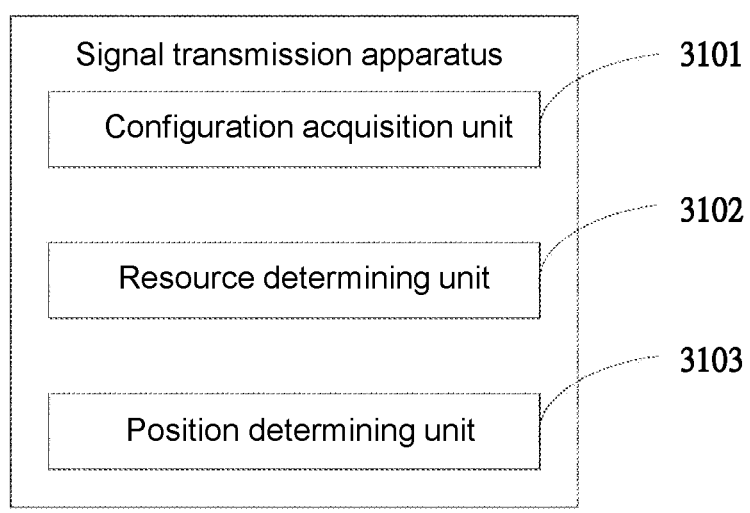
FIG. 31 is a structural block diagram of an exemplary embodiment of a signal transmission apparatus of the invention.

In addition, an embodiment of the invention further provides a signal transmission apparatus. Referring to FIG. 31, the signal transmission apparatus includes:

A configuration acquisition unit 3101 is configured to acquire transmission configuration information of the first service signal, and determine the first time-frequency resource allocated for the first service signal according to the transmission configuration information.

A resource determining unit 3102 is configured to receive resource indication information.

A position determining unit 3103 is configured to determine a start position and/or an end position for signal processing in the first time-frequency resource according to the transmission configuration information and resource indication information.

In a possible example, the transmission configuration information includes at least one of channel type, transmission mode, channel format, resource configuration mode, and priority.

In a possible example, the start position and/or end position for signal processing in the first time-frequency resource are determined according to the transmission configuration information and resource indication information. The position determining unit 3103 is configured to: determine the start position and/or end position for signal processing in the first time-frequency resource according to the transmission mode and resource indication information.

In a possible example, in the step of determining the start position and/or end position for signal processing in the first time-frequency resource according to the transmission configuration information and resource indication information, the position determining unit 3103 is configured to: when the transmission mode is the no repetition and no frequency hopping mode, determine the conflict resource between the first time-frequency resource and the second time-frequency resource indicated by the resource indication information; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the transmission mode and resource indication information, the position determining unit 3103 is configured to: when the transmission mode is the frequency hopping mode, determine the conflict resource between the first time-frequency resource and the second time-frequency resource indicated by the resource indication information, and use the frequency hopping resource where the conflict resource is located in the first time-frequency resource as the current frequency hopping resource; use the start position of the conflict resource on the current frequency hopping resource as the start position for the signal processing, and/or use the end position of the current frequency hopping resource as the end position for the signal processing.

In a possible example, in the step of determining the start position and/or end position for signal processing in the first time-frequency resource according to the transmission mode and the second time-frequency resource, the position determining unit 3103 is configured to: when the transmission mode is the repetition mode, determine the conflict resource between the first time-frequency resource and the second time-frequency resource indicated by the resource indication information, and use the repetitive resource where the conflict resource is located in the first time-frequency resource as the target repetitive resource; use the start position of the conflict resource on the target repetitive resource as the start position for the signal processing, and/or use the end position of the target repetitive resource as the end position for the signal processing; or, when the transmission mode is the repetition mode, determine the conflict resource between the first time-frequency resource and the second time-frequency resource indicated by the resource indication information; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the configuration mode and the second time-frequency resource indicated by the resource indication information, the position determining unit 3103 is configured to: when the transmission mode is a repetition mode of a dynamic configuration mode, determine the conflict resource between the first time-frequency resource and the second time-frequency resource indicated by the resource indication information, and use the repetitive resource where the conflict resource is located in the first time-frequency resource as the target repetitive resource; use the start position of the conflict resource on the target repetitive resource as the start position for the signal processing, and/or use the end position of the target repetitive resource as the end position for the signal processing.

In a possible example, in the step of determining the start position and/or end position for signal processing in the first time-frequency resource according to the configuration mode and the second time-frequency resource indicated by the resource indication information, the position determining unit 3103 is configured to: when the transmission mode is a repetition mode in a semi-static configuration mode, determine the conflict resource between the first time-frequency resource and the second time-frequency resource indicated by the resource indication information; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the transmission configuration information and resource indication information, the position determining unit 3103 is configured to: determine the start position and/or the end position for signal processing in the first time-frequency resource according to the channel format and the second time-frequency resource indicated by the resource indication information.

In a possible example, in the step of determining the start position and/or end position for signal processing in the first time-frequency resource according to the channel format and the second time-frequency resource indicated by the resource indication information, the position determining unit 3103 is configured to: determine the conflict resource between the first time-frequency resource and the second time-frequency resource indicated by the resource indication information when the signal format is a signal format without cyclic redundancy check CRC; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the channel format and the second time-frequency resource indicated by the resource indication information, the position determining unit 3103 is configured to: determine the conflict resource between the first time-frequency resource and the second time-frequency resource indicated by the resource indication information when the signal format is a signal format with a cyclic redundancy check CRC, use the repetitive resource where the conflict resource is located in the first time-frequency resource as the target repetitive resource; use the start position of the conflict resource on the target repetitive resource as the start position for signal processing, and/or use the end position of the target repetitive resource as the end position for signal processing.

In a possible example, in the step of determining the start position and/or end position for signal processing in the first time-frequency resource according to the transmission configuration information and resource indication information, the position determining unit 3103 is configured to: determine the start position and/or end position for signal processing in the first time-frequency resource according to the resource configuration mode and resource indication information.

In a possible example, in the step of determining the start position and/or end position for signal processing in the first time-frequency resource according to the resource configuration mode and resource indication information, the position determining unit 3103 is configured to: when the resource configuration mode is the configured grant CG mode, determine the conflict resource between the first time-frequency resource and the second time-frequency resource indicated by the resource indication information; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the resource configuration mode and resource indication information, the position determining unit 3103 is configured to: when the resource configuration mode is the dynamic grant DG mode and the first time-frequency resource conflicts with the second time-frequency resource indicated by the resource indication information, no signal processing is performed on the transmission on the first time-frequency resource.

In a possible example, in the step of determining the start position and/or end position for signal processing in the first time-frequency resource according to the transmission configuration information and resource indication information, the position determining unit 3103 is configured to: determine a start position and/or an end position for signal processing in the first time-frequency resource according to the priority and the resource indication information.

In a possible example, in the step of determining the start position and/or end position for signal processing in the first time-frequency resource according to the priority and the resource indication information, the position determining unit 3103 is configured to: when the priority is the first priority and the first time-frequency resource conflicts with the second time-frequency resource indicated by the resource indication information, no signal processing is performed on the transmission on the first time-frequency resource.

In a possible example, in the step of determining the start position and/or end position for signal processing in the first time-frequency resource according to the priority and the resource indication information, the position determining unit 3103 is configured to: when the priority is the second priority, determine the conflict resource between the first time-frequency resource and the second time-frequency resource indicated by the resource indication information, and the second priority is lower than the first priority; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the transmission configuration information and resource indication information, the position determining unit 3103 is configured to: determine the start position and/or end position for signal processing in the first time-frequency resource according to the resource configuration mode and priority and resource indication information.

In a possible example, in the step of determining the start position and/or end position for signal processing in the first time-frequency resource according to the resource configuration mode and priority and resource indication information, the position determining unit 3103 is configured to: when the resource configuration mode is the DG mode, the priority is the first priority, and the first time-frequency resource conflicts with the second time-frequency resource indicated by the resource indication information, no signal processing is performed on the transmission on the first time-frequency resource.

In a possible example, in the step of determining the start position and/or end position for signal processing in the first time-frequency resource according to the resource configuration mode and priority and resource indication information, the position determining unit 3103 is configured to: when the resource configuration mode is the DG mode and the priority is the second priority, determine the conflict resource between the first time-frequency resource and the second time-frequency resource indicated by the resource indication information, and the second priority is lower than the first priority; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the resource configuration mode and priority and resource indication information, the position determining unit 3103 is configured to: when the resource configuration mode is the DG mode and the priority is the first priority or the second priority, determine the conflict resource between the first time-frequency resource and the second time-frequency resource indicated by the resource indication information, and the second priority is lower than the first priority; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the resource configuration mode and priority and resource indication information, the position determining unit 3103 is configured to: when the resource configuration mode is the DG mode, the priority is the first priority or the second priority, and the first time-frequency resource conflicts with the second time-frequency resource indicated by the resource indication information, no signal processing is performed on the transmission on the first time-frequency resource, and the second priority is lower than the first priority.

In a possible example, in the step of determining the start position and/or end position for signal processing in the first time-frequency resource according to the resource configuration mode and priority and resource indication information, the position determining unit 3103 is configured to: when the resource configuration mode is the CG mode, the priority is the first priority, and the first time-frequency resource conflicts with the second time-frequency resource indicated by the resource indication information, no signal processing is performed on the transmission on the first time-frequency resource.

In a possible example, in the step of determining the start position and/or end position for signal processing in the first time-frequency resource according to the resource configuration mode and priority and resource indication information, the position determining unit 3103 is configured to: when the resource configuration mode is the CG mode and the priority is the second priority, determine the conflict resource between the first time-frequency resource and the second time-frequency resource indicated by the resource indication information; use the start position of the conflict resource on the first time-frequency resource as the start position for the signal processing, and/or use the end position of the first time-frequency resource as the end position for signal processing.

In a possible example, in the step of determining the start position and/or end position for signal processing in the first time-frequency resource according to the resource configuration mode and priority and resource indication information, the position determining unit 3103 is configured to: when the resource configuration mode is the CG mode and the priority is the first priority or the second priority, determine the conflict resource between the first time-frequency resource and the second time-frequency resource indicated by the resource indication information, and the second priority is lower than the first priority; use the start position of the conflict resource on the first time-frequency resource as the start position for the signal processing, and/or use the end position of the first time-frequency resource as the end position for the signal processing.

In a possible example, in the step of determining the start position and/or end position for signal processing in the first time-frequency resource according to the resource configuration mode and priority and resource indication information, the position determining unit 3103 is configured to: when the resource configuration mode is the CG mode, the priority is the first priority or the second priority, and the first time-frequency resource conflicts with the second time-frequency resource indicated by the resource indication information, no signal processing is performed on the transmission on the first time-frequency resource, and the second priority is lower than the first priority.

In a possible example, the transmission configuration information includes a transmission mode; in the step of determining the start position and/or end position for signal processing in the first time-frequency resource according to the transmission configuration information and resource indication information, the position determining unit 3103 is configured to: determine the conflict resource between the first time-frequency resource and the second time-frequency resource indicated by the resource indication information; determine the resource to be adjusted according to the transmission mode and the conflict resource; use the start position of the resource to be adjusted on the first time-frequency resource as the start position for the signal processing, and/or use the end position of the resource to be adjusted on the first time-frequency resource as the end position for the signal processing.

In a possible example, in the step of determining the resource to be adjusted according to the transmission mode and conflict resource, the position determining unit 3103 is configured to: when the transmission mode is no repetition and no frequency hopping mode, use the first time-frequency resource as the resource to be adjusted.

In a possible example, in the step of determining the resource to be adjusted according to the transmission mode and conflict resource, the position determining unit 3103 is configured to: when the transmission mode is a frequency hopping mode, use the frequency hopping resource where the conflict resource is located in the first time-frequency resource as a resource to be adjusted.

In a possible example, in the step of determining the resource to be adjusted according to the transmission mode and the conflict resource, the position determining unit 3103 is configured to: when the transmission mode is a repetition mode, use the repetitive resource where the conflict resource is located in the first time-frequency resource as a resource to be adjusted.

In a possible example, the apparatus further includes a determining unit configured to determine whether it is necessary to perform signal processing on the first time-frequency resource according to the transmission configuration information and the second time-frequency resource.

The position determining unit 3103 is configured to, when the determining unit determines that it is necessary to perform signal processing on the first time-frequency resource, determine the start position and/or end position for the signal processing in the first time-frequency resource according to the transmission configuration information and resource indication information.

In a possible example, the apparatus further includes a signal processing unit, and the signal processing unit is configured to, after the position determining unit 3103 determines the start position and/or end position for the signal processing in the first time-frequency resource according to the transmission configuration information and the second time-frequency resource, perform signal processing on the first service signal according to the start position and/or end position in the first time-frequency resource, and the signal processing includes: signal cancel or signal power adjustment.

Since various units in the signal transmission apparatus are configured to implement the steps of the signal transmission method described in any one of FIG. 2, FIG. 6, FIG. 11, FIG. 12, FIG. 16, FIG. 19, and FIG. 22, they at least have the advantageous effects brought by all the technical solutions of all the foregoing embodiments. Therefore, no further description is incorporated herein.

In addition, an embodiment of the invention further provides a mobile terminal. The mobile terminal includes a memory, a processor, and a signal transmission program that is stored on the memory and can be run on the processor. The signal transmission program implements the steps of the signal transmission method described in any one of FIG. 2, FIG. 6, FIG. 11, FIG. 12, FIG. 16, FIG. 19, and FIG. 22 when being executed by the processor.

Since the signal transmission program stored in the mobile terminal adopts all the technical solutions of all the foregoing embodiments when being executed by the processor, it at least has all the advantageous effects brought by all the technical solutions of all the foregoing embodiments, and no further description is incorporated herein.

Furthermore, an embodiment of the invention further provides a computer-readable storage medium having a signal transmission program stored on the computer-readable storage medium. The signal transmission program implements the steps of the mobile terminal loss processing method described in any one of FIG. 2, FIG. 6, FIG. 11, FIG. 12, FIG. 16, FIG. 19, and FIG. 22 when being executed by a processor.

Since the signal transmission program stored in the computer-readable storage medium adopts all the technical solutions of all the foregoing embodiments when being executed by the processor, it at least has all the advantageous effects brought by all the technical solutions of all the foregoing embodiments, and no further description is incorporated herein.

It should be noted that in this invention, the terms "include", "comprise" or any other variants thereof are intended to cover non-exclusive inclusion, so that a process, method, article or system including a series of elements not only includes those elements, it also includes other elements that are not explicitly listed, or elements inherent to the process, method, article, or system. In the condition with no further restrictions, the element defined by the sentence "including a . . . " does not exclude the existence of other identical elements in the process, method, article, or system that includes the element.

The sequence numbers of the above-mentioned embodiments of the invention are only for description, and do not indicate the advantages and disadvantages of the embodiments.

Through the description of the above embodiments, those skilled in the art can clearly understand that the method of the above embodiments can be implemented by means of software plus the necessary general hardware platform. Of course, it can also be achieved by hardware, but in many cases the former one is a better means for implementation. Based on this understanding, essentially the technical solution of the invention or the part that contributes to the existing technology can be embodied in the form of a software product. The computer software product is stored in a storage medium as described above (such as ROM/RAM, disks, optical disks), and includes a number of commands to enable a terminal apparatus (which can be a mobile phone, a computer, a server, an air conditioner, or a network device, etc.) to execute the methods described in the various embodiments of the invention.

The above are only preferred embodiments of the invention, and do not limit the scope of the invention. Any equivalent structure or equivalent process transformation made by using the contents of the description and drawings of the invention, or directly or indirectly applied to other related technical fields are equally involved in the scope to be protected by the invention.

What is claimed is:

1. A signal transmission method, wherein the signal transmission method comprises following steps:
acquiring transmission configuration information of a first service signal, and determining a first time-frequency resource allocated for the first service signal in physical uplink control channel (PUCCH) according to the transmission configuration information, wherein the transmission configuration information comprises a channel format and a transmission mode;

receiving resource indication information, wherein the resource indication information is generated according to a second time-frequency resource for a second service signal;

determining a start position and/or an end position for signal processing in the first time-frequency resource according to the transmission configuration information and the second time-frequency resource indicated by the resource indication information, wherein the channel format comprises a first format having an error detection and a second format not having the error detection, and the channel format is distinguished by having the error detection, the signal processing is signal cancel, and the step of determining the start position and/or the end position for the signal processing in the first time-frequency resource according to the transmission configuration information and the second time-frequency resource indicated by the resource indication information comprises:

determining a conflict resource between the first time-frequency resource and the second time-frequency resource indicated by the resource indication information when the channel format is a channel format with a cyclic redundancy check (CRC) and the transmission mode is a repetition mode;

using a resource where the conflict resource is located in the first time-frequency resource from repetitions as a target repetitive resource, wherein the repetitive are all first time-frequency resources allocated for the first service signal;

using a start position of the conflict resource on the target repetitive resource as the start position for the signal processing; and using an end position of the target repetitive resource as the end position for the signal processing.

2. The signal transmission method according to claim 1, wherein the transmission configuration information further comprises at least one of a channel type, a resource configuration mode, and a priority.

3. The signal transmission method according to claim 2, wherein the step of determining the start position and/or the end position for the signal processing in the first time-frequency resource according to the transmission configuration information and the second time-frequency resource indicated by the resource indication information comprises:

when the transmission mode is no repetition and no frequency hopping mode, determining the conflict resource between the first time-frequency resource and the second time-frequency resource indicated by the resource indication information;

using a start position of the conflict resource on the first time-frequency resource as the start position for the signal processing, and/or using an end position of the first time-frequency resource as the end position for the signal processing.

4. The signal transmission method according to claim 3, wherein the step of determining the start position and/or the end position for the signal processing in the first time-frequency resource according to the transmission configuration information and the second time-frequency resource indicated by the resource indication information comprises:

when the transmission mode is the repetition mode, determining the conflict resource between the first time-frequency resource and the second time-frequency resource indicated by the resource indication information; using a start position of the conflict resource on the first time-frequency resource as the start position for the signal processing, and/or using an end position of the first time-frequency resource as the end position for the signal processing.

5. The signal transmission method according to claim 1, wherein the step of determining the start position and/or the end position for the signal processing in the first time-frequency resource according to the transmission configuration information and the second time-frequency resource indicated by the resource indication information comprises:

determining the conflict resource between the first time-frequency resource and the second time-frequency resource indicated by the resource indication information when the signal format is a signal format without cyclic redundancy check (CRC);

using a start position of the conflict resource on the first time-frequency resource as the start position for the signal processing, and/or using an end position of the first time-frequency resource as the end position for the signal processing.

6. The signal transmission method according to claim 2, wherein the step of determining the start position and/or the end position for the signal processing in the first time-frequency resource according to the transmission configuration information and the second time-frequency resource indicated by the resource indication information comprises:

when the priority is a first priority and the first time-frequency resource conflicts with the second time-frequency resource indicated by the resource indication information, no signal processing is performed on a transmission on the first time-frequency resource.

7. The signal transmission method according to claim 6, wherein the step of determining the start position and/or the end position for the signal processing in the first time-frequency resource according to the transmission configuration information and the second time-frequency resource indicated by the resource indication information comprises:

when the priority is a second priority, determining a conflict resource between the first time-frequency resource and the second time-frequency resource indicated by the resource indication information, wherein the second priority is lower than the first priority;

using a start position of the conflict resource on the first time-frequency resource as the start position for the signal processing, and/or using an end position of the first time-frequency resource as the end position for the signal processing.

8. The signal transmission method according to claim 1, wherein the step of determining the start position and/or the end position for the signal processing in the first time-frequency resource according to the transmission configuration information and the second time-frequency resource indicated by the resource indication information comprises:

determining a resource to be adjusted according to the transmission mode and the conflict resource;

using a start position of the resource to be adjusted on the first time-frequency resource as the start position for the signal processing, and/or using an end position of the resource to be adjusted on the first time-frequency resource as the end position for the signal processing.

9. A mobile terminal, comprising a memory, a processor, and a signal transmission program stored on the memory and run on the processor, so that the processor is configured to perform:

acquiring transmission configuration information of a first service signal, and determining a first time-frequency resource allocated for the first service signal in physical uplink control channel (PUCCH) according to the transmission configuration information, wherein the transmission configuration information comprises a channel format and a transmission mode;

receiving resource indication information, wherein the resource indication information is generated according to a second time-frequency resource for a second service signal;

determining a start position and/or an end position for signal processing in the first time-frequency resource according to the transmission configuration information and the second time-frequency resource indicated by the resource indication information, wherein the channel format comprises a first format having an error detection and a second format not having the error detection, and the channel format is distinguished by having the error detection, the signal processing is signal cancel, and the processor is further configured to perform:

determining a conflict resource between the first time-frequency resource and the second time-frequency resource indicated by the resource indication information when the channel format is a channel format with a cyclic redundancy check (CRC) and the transmission mode is a repetition mode;

using a resource where the conflict resource is located in the first time-frequency resource from repetitions as a target repetitive resource, wherein the repetitive are all first time-frequency resources allocated for the first service signal;

using a start position of the conflict resource on the target repetitive resource as the start position for the signal processing; and using an end position of the target repetitive resource as the end position for the signal processing.

10. The mobile terminal according to claim 9, wherein the transmission configuration information further comprises at least one of a channel type, a resource configuration mode, and a priority.

11. The mobile terminal according to claim 10, wherein the processor is further configured to perform:

when the transmission mode is no repetition and no frequency hopping mode, determining the conflict resource between the first time-frequency resource and the second time-frequency resource indicated by the resource indication information;

using a start position of the conflict resource on the first time-frequency resource as the start position for the signal processing, and/or using an end position of the first time-frequency resource as the end position for the signal processing.

12. The mobile terminal according to claim 11, wherein the processor is further configured to perform:

when the transmission mode is the repetition mode, determining the conflict resource between the first time-frequency resource and the second time-frequency resource indicated by the resource indication information; using a start position of the conflict resource on the first time-frequency resource as the start position for the signal processing, and/or using an end position of the first time-frequency resource as the end position for the signal processing.

13. The mobile terminal according to claim 9, wherein the processor is further configured to perform:

determining the conflict resource between the first time-frequency resource and the second time-frequency resource indicated by the resource indication information when the signal format is a signal format without cyclic redundancy check (CRC);

using a start position of the conflict resource on the first time-frequency resource as the start position for the signal processing, and/or using an end position of the first time-frequency resource as the end position for the signal processing.

14. The mobile terminal according to claim 10, wherein the processor is further configured to perform:

when the priority is a first priority and the first time-frequency resource conflicts with the second time-frequency resource indicated by the resource indication information, no signal processing is performed on a transmission on the first time-frequency resource.

15. The mobile terminal according to claim 14, wherein the processor is further configured to perform:

when the priority is a second priority, determining a conflict resource between the first time-frequency resource and the second time-frequency resource indicated by the resource indication information, wherein the second priority is lower than the first priority;

using a start position of the conflict resource on the first time-frequency resource as the start position for the signal processing, and/or using an end position of the first time-frequency resource as the end position for the signal processing.

16. The mobile terminal according to claim 9, wherein the transmission configuration information comprises a transmission mode, and the processor is further configured to perform:

determining a resource to be adjusted according to the transmission mode and the conflict resource;

using a start position of the resource to be adjusted on the first time-frequency resource as the start position for the signal processing, and/or using an end position of the resource to be adjusted on the first time-frequency resource as the end position for the signal processing.

* * * * *